US 12,236,516 B2

(12) United States Patent
Barnard et al.

(10) Patent No.: US 12,236,516 B2
(45) Date of Patent: Feb. 25, 2025

(54) INTERSECTION TESTING IN A RAY TRACING SYSTEM

(71) Applicant: Imagination Technologies Limited, Kings Langley (GB)

(72) Inventors: Daniel Barnard, Hertfordshire (GB); Mike Livesley, Hertfordshire (GB); Gregory Clark, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 286 days.

(21) Appl. No.: 17/847,557

(22) Filed: Jun. 23, 2022

(65) Prior Publication Data

US 2023/0023323 A1    Jan. 26, 2023

(30) Foreign Application Priority Data

Jun. 23, 2021  (GB) ...................................... 2108998

(51) Int. Cl.
  *G06T 15/06*   (2011.01)
  *G06T 15/00*   (2011.01)
  *G06T 15/08*   (2011.01)

(52) U.S. Cl.
  CPC ............ *G06T 15/06* (2013.01); *G06T 15/005* (2013.01); *G06T 15/08* (2013.01); *G06T 2210/12* (2013.01); *G06T 2210/21* (2013.01)

(58) Field of Classification Search
  CPC ....... G06T 15/06; G06T 15/005; G06T 15/08; G06T 2210/12; G06T 2210/21
  See application file for complete search history.

(56) References Cited

U.S. PATENT DOCUMENTS

| 2009/0167763 A1* | 7/2009 | Waechter ............... G06T 15/40 345/426 |
| 2020/0051316 A1 | 2/2020 | Laine et al. |

(Continued)

OTHER PUBLICATIONS

Anonymous, "DirectX Raytracing (DXR) Functional Spec: version 1. 15", pp. 1-217;URL: https://web.archive.org/web/20210516213727 https://microsoft.github.io/DirectX-S12ecs/d3d/Raytracing.html.

(Continued)

*Primary Examiner* — Michelle Chin
(74) *Attorney, Agent, or Firm* — Potomac Law Group, PLLC; Vincent M DeLuca

(57) ABSTRACT

A ray tracing unit and method for processing a ray in a ray tracing system performs intersection testing for the ray by performing one or more intersection testing iterations. Each intersection testing iteration includes: (i) traversing an acceleration structure to identify the nearest intersection of the ray with a primitive that has not been identified as the nearest intersection in any previous intersection testing iterations for the ray; and (ii) if, based on a characteristic of the primitive, a traverse shader is to be executed in respect of the identified intersection: executing the traverse shader in respect of the identified intersection; and if the execution of the traverse shader determines that the ray does not intersect the primitive at the identified intersection, causing another intersection testing iteration to be performed. When the intersection testing for the ray is complete, an output shader is executed to process a result of the intersection testing for the ray.

20 Claims, 8 Drawing Sheets

(56) References Cited

U.S. PATENT DOCUMENTS

| | | | |
|---|---|---|---|
| 2021/0390759 A1* | 12/2021 | Muthler | G06T 17/10 |
| 2021/0407175 A1* | 12/2021 | Saleh | G06T 15/06 |

OTHER PUBLICATIONS

Abstracts of The 2021 CHI Conference on Human Factors in Computing Systems, 2020, Lee, Won Jong et al, "Lazy Build of Acceleration Structures with Traversal Shaders", pp. 1-4 sections 2, 3.

* cited by examiner

INTERSECTION TESTING IN A RAY TRACING SYSTEM

FIELD

The present disclosure is directed to processing data (e.g. including performing intersection testing) for one or more rays in a ray tracing system.

BACKGROUND

Ray tracing is a computational rendering technique for generating an image of a scene (e.g. a 3D scene) by tracing paths of light ('rays'), e.g. from the viewpoint of a camera through the scene. Each primary ray is modelled as originating from the camera and passing through a pixel into the scene. As a ray traverses the scene it may intersect objects within the scene. The interaction between a ray and an object it intersects can be modelled to create realistic visual effects. For example, a ray may be processed by performing intersection testing in order to determine an intersection of the ray with an object (e.g. a primitive in the scene), and in response to determining an intersection of the ray with the object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing any relevant secondary rays) can be the calculation of a colour value for the pixel that the primary ray passed through. A shader program may be referred to simply as a "shader". The shader programs mentioned above which are executed to define how the system reacts to a confirmed (or "committed") intersection may be referred to herein as "output shaders" since they are invoked on the output of the intersection testing performed for a ray. An output shader may, for example, be a closest hit shader or a miss shader. A closest hit shader may be used to determine output colour values, and may be executed after the closest intersected primitive has been found by the intersection testing process. A miss shader is used to determine how the system reacts if the ray is found to not intersect any primitives in the scene.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene. Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the alignment relative to the axes of the coordinate system is not predetermined.

Some ray tracing standards defining how ray tracing should be performed (e.g. Vulkan® and DirectX Raytracing ("DXR")®) have introduced new types of shaders, which may be referred to as "traverse shaders". A traverse shader is a shader program which can be executed in order to determine whether a ray intersects an object. The role of a traverse shader in finding intersections is part of the intersection testing process for a ray in traversing an acceleration structure, rather than the shading of output colours that happens after the intersection testing process by the output shaders.

One example of a traverse shader is an "any hit shader". An any hit shader is executed for an intersection between a ray and a primitive, and the purpose of executing an any hit shader is to decide whether the intersection should be accepted or discarded. For example, an any-hit shader may be used to determine whether the primitive is opaque or transparent (or translucent) at the intersection point. For example, a texture may store alpha values which can be applied to a primitive, and the execution of an any hit shader may determine an alpha value at the intersection point based on the texture. This process may be referred to as "alpha masking", i.e. using a texture to specify which parts of a triangle are transparent. If the primitive is transparent at the intersection point then the intersection is discarded, whereas if the primitive is opaque (or translucent) at the intersection point then the intersection is accepted. Primitives marked as opaque do not run any-hit shaders. If the primitive is translucent at the intersection point then another ray may be emitted from the intersection point to blend the results with.

Another example of a traverse shader is an "intersection shader". Intersection shaders are executed when a ray is found to intersect a procedural primitive. A procedural primitive is represented as a volume (e.g. an axis-aligned bounding box (AABB)) for the purposes of traversing the acceleration structure. An intersection shader is executed for a ray if the ray is found to intersect the volume representing the procedural primitive. Implicit geometry is defined within (and bounded by) the volume of the procedural primitive, and the execution of the intersection shader determines whether the ray intersects the implicit geometry. As a simple example, the implicit geometry that is defined within the volume (e.g. AABB) of a procedural primitive may be a sphere. The intersection shader may represent a sphere by storing parameters for a sphere equation, and the execution of the intersection shader may evaluate that sphere equation against the ray directly to decide if there is an intersection between the ray and the implicit geometry. In other examples, the shape of the implicit geometry may be something other than a sphere.

Ray tracing standards defining how ray tracing should be performed (e.g. Vulkan® and DirectX Raytracing ("DXR")® require a deterministic order of shader execution, including for any-hit shaders and intersection shaders. This is to ensure that the output is deterministic. For example, some shaders have dependencies between each other, so if the shader order was not deterministic, it would be possible to get different outputs from the same inputs. For example some types of blending are order dependent and having two shaders try to blend could end up with different results if the order of the execution of the shaders was changed. Furthermore, determinism makes programming and debugging the system easier.

In some ray tracing systems the traversal of the acceleration structure involves testing a ray for intersection with nodes representing closer regions before more distant regions in the scene. In these systems, the traverse shaders can be executed as and when they are needed during the intersection testing process, and this will provide a deterministic order of shader execution, including for any-hit shaders and intersection shaders as required by the ray tracing standards mentioned above. For example, the intersection testing process could involve the steps of:

1. Find the next intersection for the ray with a primitive in the scene
2. If the found intersection requires an any hit shader:
   a. Run the any hit shader in respect of the intersection
   b. If the intersection is rejected by the any hit shader, go to step 1
3. If the found intersection requires an intersection shader:
   a. Run the intersection shader in respect of the intersection
   b. If no intersection is found, go to step 1.
4. Update ray results for the found intersection
5. Go to step 1

In this situation, when the intersection testing process has finished for the ray then the nearest intersection for a ray has been found, and an output shader can be executed for that intersection.

As mentioned above, rendering a scene using ray tracing may involve a huge amount of processing, e.g. intersection testing and execution of shaders. In particular, it would be useful to be able to render a sequence of frames in real-time (e.g. at a frame rate of 25, 30 or 60 frames per second just to give some examples), for example for use in rendering images of a computer game as a user navigates through a virtual 3D scene. Furthermore, it would be useful to be able to perform such rendering on a small device, e.g. in a games console or mobile device rather than requiring a supercomputer. As such, it would be beneficial to improve the efficiency of the ray tracing system (e.g. in terms of processing latency, power consumption and/or silicon area), whilst still complying with the requirements of the ray tracing standards, e.g. the requirement for a deterministic order of shader execution, including for any-hit shaders and intersection shaders.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of processing a ray in a ray tracing system, comprising:
  performing intersection testing for the ray by performing one or more intersection testing iterations, wherein each intersection testing iteration comprises:
    traversing an acceleration structure to identify the nearest intersection of the ray with a primitive that has not been identified as the nearest intersection in any previous intersection testing iterations for the ray; and
    in response to determining, based on a characteristic of the primitive, that a traverse shader is to be executed in respect of the identified intersection:
      executing the traverse shader in respect of the identified intersection; and
      in response to the execution of the traverse shader determining that the ray does not intersect the primitive at the identified intersection, causing another intersection testing iteration to be performed; and
  when the intersection testing for the ray is complete, executing an output shader to process a result of the intersection testing for the ray,
  wherein a traverse shader is executed in respect of an identified intersection for the ray in at least one of the one or more intersection testing iterations.

The traverse shader may be an any hit shader. The execution of the any hit shader in respect of the identified intersection may determine that either: the identified intersection is accepted, such that the ray intersects the primitive at the identified intersection; or the identified intersection is discarded, such that the ray does not intersect the primitive at the identified intersection. In some examples, an any hit shader is to be executed in respect of the identified intersection if the primitive is not opaque.

The traverse shader may be an intersection shader. In some examples, an intersection shader is to be executed in respect of the identified intersection if the primitive is a procedural primitive which is represented as a volume for the purposes of traversing the acceleration structure. The volume representing the procedural primitive may be an axis-aligned bounding box.

The identified intersection of the ray with the procedural primitive may be at a position which is a minimum distance along the ray at which the ray is valid and at which the ray intersects the volume representing the procedural primitive.

The execution of the intersection shader in respect of the identified intersection may determine that:
  the ray intersects the primitive at a further position within the volume representing the procedural primitive which is different to the position of the identified intersection, such that the ray does not intersect the primitive at the identified intersection; or
  the ray does not intersect the primitive within the volume of the procedural primitive, such that the ray does not intersect the primitive at the identified intersection.

The order in which the ray is tested for intersection with primitives in a scene may be non-deterministic.

Said intersection testing may be performed on multiple rays, and said traversing an acceleration structure may comprise:

grouping rays together into a packet of rays to be tested for intersection against the same node of the acceleration structure; and processing the packet of rays to thereby test the rays of the packet for intersection against said same node of the acceleration structure (e.g. in parallel, for example using SIMD processing units).

Said traversing an acceleration structure may be performed in fixed function circuitry.

Packets of rays may be scheduled for intersection testing against nodes of the acceleration structure based on the fullness of the packets.

The acceleration structure may have a hierarchical tree structure and during the traversal of the acceleration structure, a ray may exist in multiple branches of the hierarchical tree structure simultaneously.

The method may comprise:

In response to determining, during a current intersection testing iteration, that another intersection testing iteration is to be performed:
  storing data relating to the identified intersection that was identified during the current intersection testing iteration; and
  using said stored data to avoid identifying the same intersection again in said another intersection testing iteration.

Three sets of data may be stored for the ray during the intersection testing. The three sets of data may comprise:
  (i) a candidate set which keeps track of the nearest intersection that has been identified so far for the ray during the traversal of the acceleration structure in a current intersection testing iteration;
  (ii) a non-committed set which indicates a minimum intersection distance at which an intersection can be accepted as an identified intersection during the traversal of the acceleration structure in the current intersection testing iteration; and
  (iii) a committed set which indicates a maximum intersection distance at which an intersection could be found by said intersection testing for the ray.

At the start of an initial intersection testing iteration for the ray:
  a minimum culling distance for the ray may be stored in the non-committed set for the ray; and
  a maximum culling distance for the ray may be stored in the candidate set and in the committed set for the ray.

In response to determining that another intersection testing iteration is to be performed after the current intersection testing iteration the method may comprise, before said another intersection testing iteration is performed:
  copying data from the candidate set at the end of the current intersection testing iteration into the non-committed set; and subsequently
  copying data from the committed set at the end of the current intersection testing iteration into the candidate set.

The method may comprise, during the traversal of the acceleration structure in the current intersection testing iteration, in response to finding an intersection of the ray with a primitive:
  updating the candidate set if the found intersection is nearer than the current nearest intersection indicated by the data in the candidate set; and
  updating the committed set if: (i) the found intersection is nearer than the maximum intersection distance indicated by the data in the committed set, (ii) the primitive is opaque, and (iii) the primitive is not a procedural primitive.

Each of the three sets of data may comprise:
  an indication of a distance along the ray; and
  if the set of data relates to an intersection of the ray with a particular primitive:
    an indication of a type of the particular primitive;
    an indication of an opacity of the particular primitive; and
    one or more indices associated with the particular primitive.

The one or more indices may comprise an instance index, a geometry index and a primitive index associated with the particular primitive.

The method may comprise, during the traversal of the acceleration structure, in response to finding an intersection for the ray with the particular primitive at an intersection distance that is equal to an intersection distance of a previous intersection for the ray with another primitive, wherein said previous intersection is indicated by the data in one of said three sets of data:
  comparing a unique primitive identifier for the particular primitive with a unique primitive identifier for said other primitive; and
  determining whether to treat the found intersection as nearer than the previous intersection based on the result of the comparison of the unique primitive identifiers.

The unique primitive identifier for a primitive may be based on the one or more indices.

The method may further comprise:
  determining the unique identifier for the particular primitive using a concatenation of the instance index, the geometry index and the primitive index associated with the particular primitive; and
  determining the unique identifier for said other primitive using a concatenation of an instance index, a geometry index and a primitive index associated with said other primitive.

During the traversal of the acceleration structure, in response to (i) an intersection being found with a procedural primitive, and (ii) a position at said minimum intersection distance along the ray at which an intersection can be accepted as an identified intersection during the traversal of the acceleration structure in the current intersection testing iteration being within the procedural primitive:
  the found intersection may be determined to be at said minimum intersection distance along the ray during the traversal of the acceleration structure.

The output shader may be a closest hit shader or a miss shader.

A closest hit shader may be executed in respect of the nearest accepted intersection found by performing the intersection testing for the ray.

A result of executing the output shader may be used for rendering an image of a 3D scene.

There is provided a ray tracing unit comprising:
  an intersection testing module; and
  processing logic;
  wherein the ray tracing unit is configured to:
    perform intersection testing for a ray by performing one or more intersection testing iterations, wherein each intersection testing iteration comprises:
      traversing an acceleration structure using the intersection testing module to identify the nearest intersection of the ray with a primitive that has not been identified as the nearest intersection in any previous intersection testing iterations for the ray; and in response to determining, based on a characteristic of the primitive, that a traverse shader is to be executed in respect of the identified intersection:

executing the traverse shader on the processing logic in respect of the identified intersection; and in response to the execution of the traverse shader determining that the ray does not intersect the primitive at the identified intersection, causing another intersection testing iteration to be performed; and when the intersection testing for the ray is complete, execute an output shader on the processing logic to process a result of the intersection testing for the ray.

The ray tracing unit may further comprise a processing module configured to:

receive geometric data defining geometry in a scene; and
generate the acceleration structure based on the received geometric data.

The intersection testing module may be implemented in fixed function circuitry in the ray tracing unit.

There is provided a method of manufacturing, using an integrated circuit manufacturing system, a ray tracing unit as described herein, the method comprising:

processing, using a layout processing system, a computer readable description of the ray tracing unit so as to generate a circuit layout description of an integrated circuit embodying the ray tracing unit; and manufacturing, using an integrated circuit generation system, the ray tracing unit according to the circuit layout description.

There is provided a ray tracing unit configured to perform any of the methods described herein.

The ray tracing unit may be embodied in hardware on an integrated circuit. There may be provided a method of manufacturing, at an integrated circuit manufacturing system, a ray tracing unit. There may be provided an integrated circuit definition dataset that, when processed in an integrated circuit manufacturing system, configures the system to manufacture a ray tracing unit. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying a ray tracing unit.

There may be provided an integrated circuit manufacturing system comprising: a non-transitory computer readable storage medium having stored thereon a computer readable description of the ray tracing unit; a layout processing system configured to process the computer readable description so as to generate a circuit layout description of an integrated circuit embodying the ray tracing unit; and an integrated circuit generation system configured to manufacture the ray tracing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
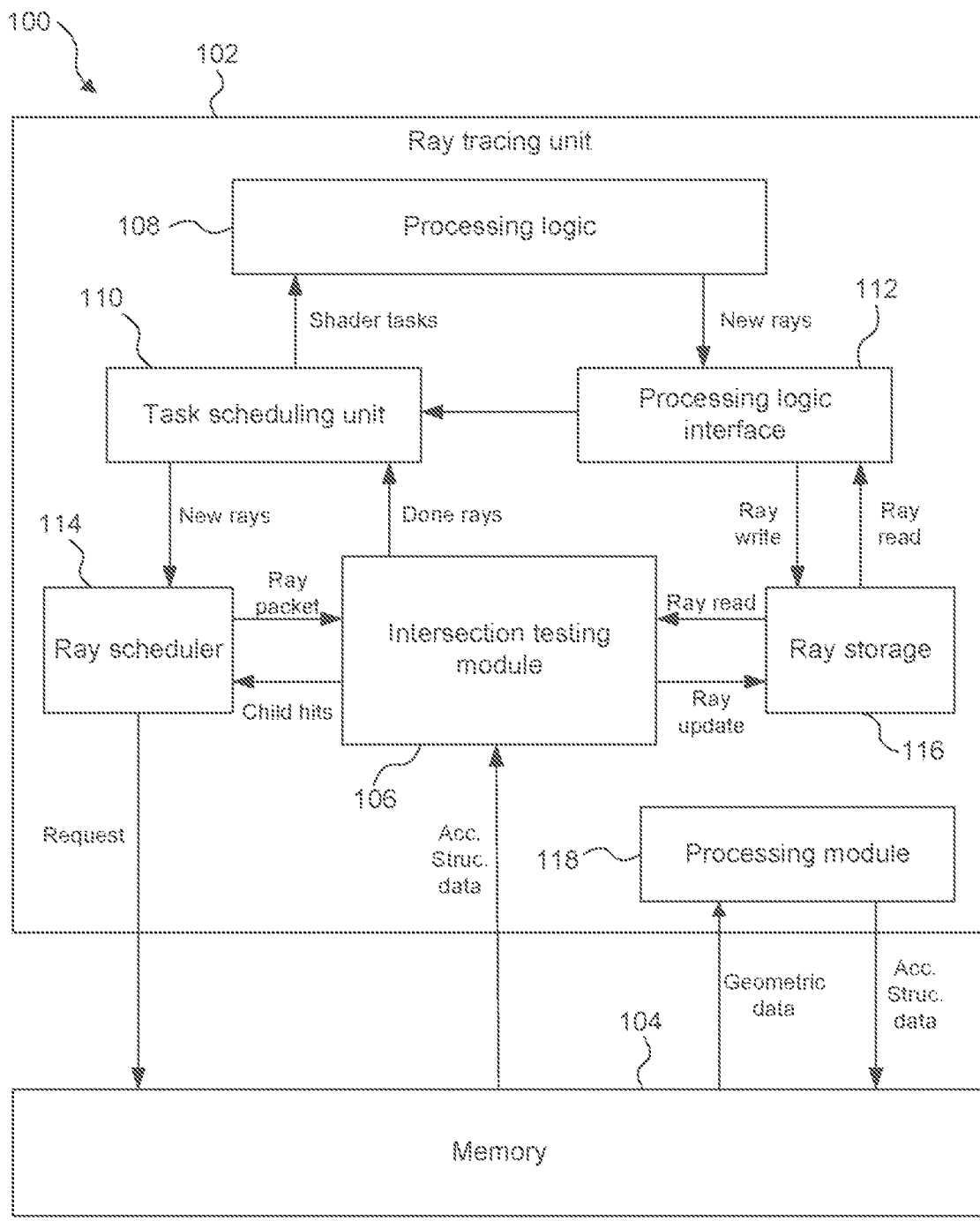
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described in more detail below, in order to improve the efficiency of the ray tracing system, rays are grouped together into "packets" (which may be referred to as "collections") of rays which are to be tested for intersection with the same piece of geometry. The piece of geometry could be a volume represented by a node of the acceleration structure or the piece of geometry could be a primitive. Then the rays of a packet of rays can be tested together for intersection with the geometry, e.g. at similar times (or the same time). The rays of a packet of rays could be tested for intersection with a piece of geometry in parallel or in series so that the tests are performed at the same (or similar) times. Testing a packet of rays together rather than testing rays individually provides memory access benefits, e.g. it means that when geometry data is fetched from memory and stored on-chip, a greater number of rays (on average) are tested against that geometry data whilst it is still stored on-chip, such that fewer fetches of geometry data are needed in total. For example, the geometry data for a given box or primitive can be fetched from memory once and stored locally, and then a plurality of rays can be tested for intersection against that same geometry data. In contrast, if rays were not grouped into packets as described herein, the intersection tests for rays against the same geometry data would have potentially been performed many cycles apart and may have involved a separate read of the geometry data from memory. Decreasing the number of times that data is read from memory onto the ray tracing unit will reduce the bandwidth required by the ray tracing system, and will dramatically improve the performance of the ray tracing system (e.g. in terms of processing latency and power consumption). In addition, grouping rays together for intersection testing against the same geometry data also helps to increase the utilisation of processing units which perform intersection testing (i.e. reduce the time for which the processing units are idle), which is also an aim of an efficient ray tracing system.

The process of grouping rays together into packets to be tested together against the same piece of geometry may be referred to as "coherency gathering". That is, coherence gathering involves grouping rays together into packets which will access the same hierarchy data from memory. Although this coherency gathering improves the efficiency of the intersection testing process (e.g. by reducing the number of times that the same piece of data needs to be fetched from memory), it leads to a non-deterministic traversal of the acceleration structure. In other words, the order in which the rays are tested against items of geometry (e.g. nodes of the acceleration structure) is not deterministic. That is, a ray tracing system which uses coherence gathering in a manner as described herein (in which if a ray is tested and determined to hit multiple nodes of the acceleration structure then the rays for testing against the children of the intersected nodes are gathered together into packets simultaneously) is inherently non-deterministic in the order in which rays traverse the acceleration structure to find intersections with primitives. The acceleration structure may be hierarchical and may be described as a "tree". During the traversal of the acceleration structure, a ray can exist in many branches of the tree simultaneously, and the order in which the ray advances down different branches depends upon many factors including the time data returns from memory, which is out of the control of the ray tracing unit, and so can be treated as being essentially random. This leads to a non-deterministic order in which rays are tested for intersection with primitives during the traversal of the acceleration structure. As mentioned above, ray tracing standards defining how ray tracing should be performed (e.g. Vulkan® and DirectX Raytracing ("DXR")® require a deterministic order of shader execution, including for traverse shaders. If the traversal of the acceleration structure is non-deterministic, it is not trivial to comply with this requirement of the ray tracing standards, particularly for traverse shaders which are part of the intersection testing process. The examples described herein allow the efficiencies of coherency gathering to be maintained whilst also complying with the requirement in the ray tracing standards of having a deterministic order of shader execution.

In the system described in the background section above, the order in which traverse shaders are executed depends on the order in which intersections are found, so a non-deterministic traversal would result in nondeterministic shader execution order. So a different approach is taken in the examples described herein.

In particular, the shader execution order is decoupled from the traversal by deferring the execution of traverse shaders until the nearest intersection has been found by the traversal. If a traverse shader rejects that intersection, then the next nearest intersection is found by traversing the acceleration structure again. This process reduces the number of shader executions, and reduces back and forth between the ray traversal hardware and shading hardware, at the expense of more ray traversal work.

In examples described herein, the method involves performing one or more intersection testing iterations (which may be referred to as "hierarchy search iterations") which involve finding the nearest intersection with a primitive (without executing any traverse shaders) that has not been identified as the nearest intersection in any previous intersection testing iterations. After an intersection testing iteration, a traverse shader may be executed to determine whether the identified nearest intersection is a valid intersection. If the traverse shader does not determine that the ray intersects the primitive at the identified intersection then another intersection testing iteration can be performed to identify the next nearest intersection of the ray with a primitive.

In this way the order in which the shaders (including the traverse shaders) are executed is deterministic. In particular, traverse shaders will be executed for nearer intersections before more distant intersections. However, the order in which the ray is tested for intersection with different nodes of the acceleration structure during the traversal of the acceleration structure is not deterministic. As such, the benefits of coherency gathering can be maintained, whilst also complying with the requirement of having a deterministic order in which the shaders are executed. A cost of this approach is that some of the processing involved in traversing the acceleration structure for a ray may be duplicated in different intersection testing iterations, but in most cases the benefits provided by being able to use coherency gathering (e.g. benefits in terms of reducing the number of times that data needs to be fetched from memory) far outweigh the drawbacks of duplicating some processing in the traversal of the acceleration structure. It is noted that accessing data from memory is a costly operation (in terms of latency and power consumption). It is further noted that the ray tracing unit of examples described herein has an intersection testing module which is implemented in hardware (e.g. using fixed function circuitry) to perform intersection testing of rays with respect to geometry very efficiently, e.g. for packets of rays in parallel, so the processes involved in performing intersection testing are not very costly (in terms of latency and power consumption) compared to accessing data from memory.

FIG. 1 shows a ray tracing system 100 comprising a ray tracing unit 102 and a memory 104. The memory 104 could be a memory hierarchy, which may include one or more levels of cache memory. The ray tracing unit 102 comprises an intersection testing module 106, processing logic 108, a task scheduling unit 110, a processing logic interface 112, a ray scheduler 114, ray storage 116 and a processing module 118. The intersection testing module 106 comprises one or more intersection testing units (not shown in the figure), e.g. including one or more box intersection testing units configured to perform intersection tests for rays with respect to axis-aligned boxes, one or more triangle intersection testing units configured to perform intersection tests for rays with respect to triangular primitives, and/or one or more procedural intersection testing units configured to perform intersection tests for ray with respect to volumes representing procedural primitives. As mentioned above, the intersection testing module 106 may be implemented in hardware (e.g. in fixed function circuitry) so that it can efficiently perform intersection testing. In general, any of the functions of the ray tracing unit described herein may be performed in software, hardware, firmware or some combination thereof. Software implementations generally provide more flexibility because software is more easily altered after it is designed and/or created than hardware implementations. However, hardware implementations generally provide more efficient implementations in terms of latency and power consumption, so if the desired functionality is known in advance (which is the case for the intersection testing operations), hardware implementations may be preferred over software implementations.

An acceleration structure (e.g. a hierarchical acceleration structure) is generated to represent geometry in a scene to be rendered, and the acceleration structure is stored in the memory 104. For example, the processing module 118 may receive geometric data (e.g. submitted by an application) defining geometry in the scene to be rendered. The scene may be a 3D scene. The processing module 118 may generate a hierarchical acceleration structure based on the received geometric data. Techniques for generating acceleration structures are known in the art, and the details of these techniques are beyond the scope of this disclosure. However, to give a very brief explanation of one example, the processing module 118 may generate leaf nodes of the acceleration structure which represent volumes (e.g. AABBs) which bound primitives in the scene, and then the processing module 118 may generate the nodes of the acceleration structure above the leaf nodes in a bottom-up manner to thereby create the hierarchical acceleration structure. In other examples, a top-down approach may be taken to building the acceleration structure. As described in detail herein, the hierarchical acceleration structure is for use in intersection testing. The hierarchical acceleration structure can be stored in the memory 104. In the example described above the acceleration structure is generated by the processing module 118, but in other examples the acceleration structure may be generated (e.g. pre-computed) by a module which is external to the ray tracing unit 102 and may be stored in the memory 104 for use by the ray tracing unit 102.

Figure 2:
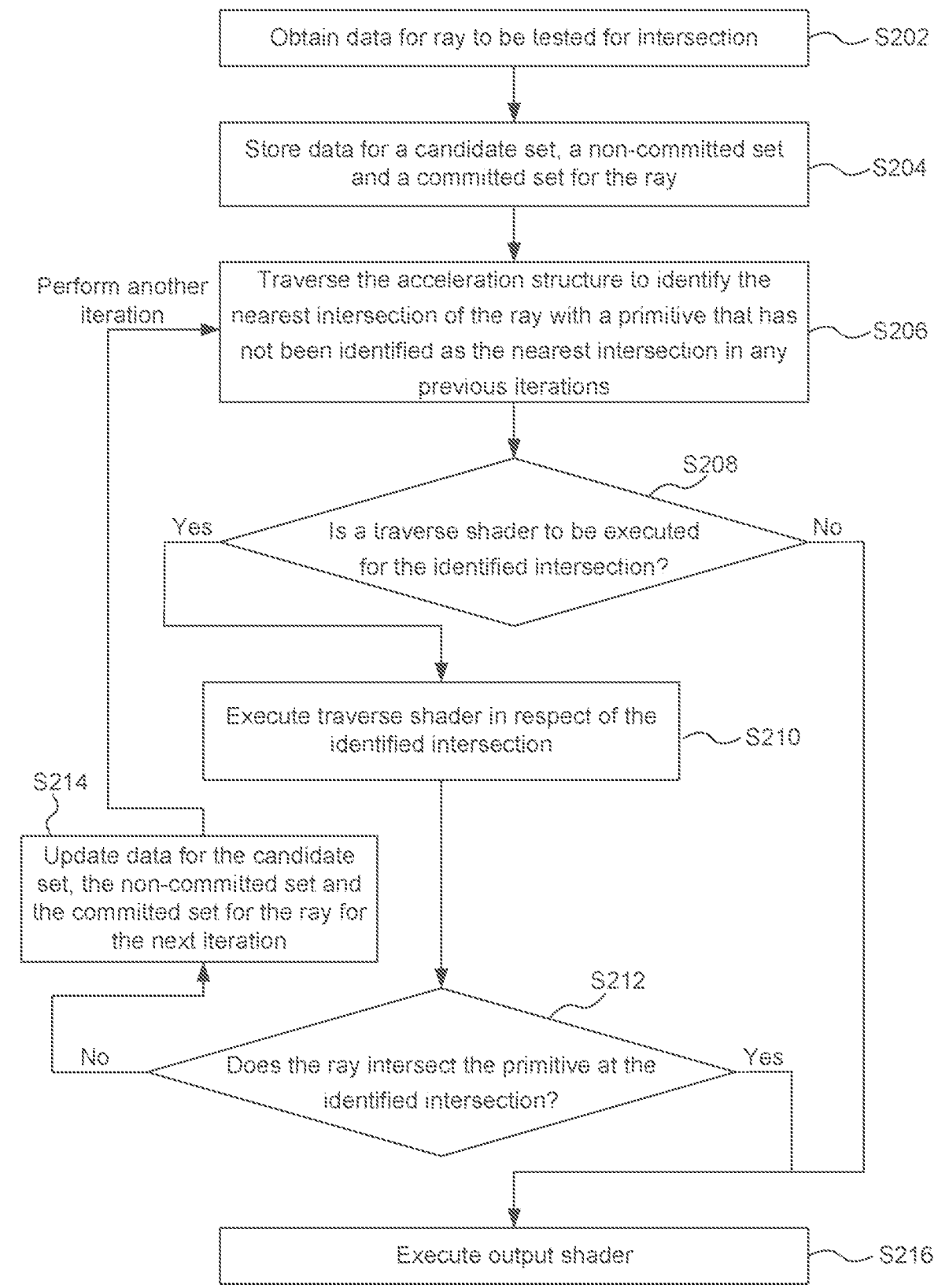
FIG. 2 shows a flow chart for a method of processing data in a ray tracing system according to examples described herein.

Operation of the ray tracing system 100 is described with reference to the flow chart shown in FIG. 2. The steps of the flow chart shown in FIG. 2 describe the processing of a ray, but it is to be understood that more than one ray may be processed at the same time in the method. In step S202 data for a ray to be tested for intersection is obtained. For example, new rays may be created by a shader (e.g. a "ray generation shader", a closest hit shader or a miss shader) executed by the processing logic 108. The new ray is passed from the processing logic 108 to the processing logic interface 112 to begin traversal of the ray.

In step S204 data for the new ray is written into the ray storage 116. In particular, three sets of data are stored for the ray during intersection testing of the ray. The three sets of data comprise: (i) a candidate set which keeps track of the nearest intersection that has been identified so far for the ray during the traversal of the acceleration structure in a current intersection testing iteration, (ii) a non-committed set which indicates a minimum intersection distance at which an intersection can be accepted as an identified intersection during the traversal of the acceleration structure in the current intersection testing iteration, and (iii) a committed set which indicates a maximum intersection distance at which an intersection could be found by said intersection testing for the ray.

In examples described herein the processing of a ray in the ray tracing system 100 comprises performing intersection testing for the ray by performing one or more intersection testing iterations. In the example shown in FIG. 2, each intersection testing iteration comprises the steps S206 to S212.

In step S206 the intersection testing module 106 traverses the acceleration structure to identify the nearest intersection of the ray with a primitive that has not been identified as the nearest intersection in any previous intersection testing iterations for the ray. The traversal of the acceleration structure in step S206 does not include the execution of any shaders (e.g. traverse shaders). In other words, step S206 finds the nearest intersected primitive for the ray prior to shader evaluation.

Before step S206 is performed, rays may be passed, via the task scheduling unit 110, to the ray scheduler 114 which is configured to perform coherency gathering. As described above, the coherency gathering, performed by the ray scheduler 114, involves grouping rays together into packets (or "collections") which are to be tested for intersection with the same piece of geometry (e.g. the same node of the acceleration structure or the same primitive). At some point, a group of rays (i.e. a ray packet) is passed from the ray scheduler 114 to the intersection testing module 106 so that intersection testing can be performed for the rays in the ray packet. For example, packets of rays may be scheduled for intersection testing against nodes of the acceleration structure based on the fullness of the packets. For example, there may be a maximum number of rays which can be included in a packet (e.g. which may be equal to the number of rays that the intersection testing module 106 can process in parallel), and when the ray scheduler 114 determines that a ray packet contains the maximum number of rays then that ray packet is passed from the ray scheduler 114 to the intersection testing module 106. As another example, if a packet is due to be sent to the intersection testing module 106 (e.g. because it has been longer than a threshold amount of time since a ray packet has been sent to the intersection testing module, or because the intersection testing module 106 indicates that it has become, or is about to become, idle) then the ray scheduler 114 may send the ray packet which contains the greatest number of rays even if does not include the maximum number of rays. Furthermore, there may be a maximum number of packets that the ray scheduler 114 can hold at any one time, and if the ray scheduler 114 determines that it is currently holding the maximum number of packets then a packet (e.g. the packet which contains the greatest number of rays) may be passed from the ray scheduler 114 to the intersection testing module 106.

As part of step S206, the intersection testing module 106 fetches (i.e. reads) acceleration structure data from the memory 104. In particular, the intersection testing module 106 may fetch the data for a node of the acceleration structure against which the rays of a ray packet are to be tested for intersection. The intersection testing module 106 may also fetch primitive data from the memory 104 if the rays are to be tested for intersection with respect to a primitive. Furthermore, as part of step S206 the intersection testing module 106 fetches ray data for the rays of the packet from the ray storage 116. It is noted that where we describe the task scheduling unit 110 and the ray scheduler 114 processing "rays" it is to be understood that they may be processing ray identifiers ("ray IDs") for the rays. Therefore, rather than carrying all of the data associated with the rays around the ray tracing unit 102 to the task scheduling unit 110 and the ray scheduler 114, most of the data for the rays is stored in the ray storage 116, and it is just the ray IDs that are involved in scheduling the rays for processing. When the intersection testing module 106 or the processing logic 108 is to process a ray then the ray ID for the ray is used to fetch more ray data associated with the ray from the ray storage. The ray data associated with a ray may for example comprise a ray origin, a ray direction vector, a minimum culling distance, a maximum culling distance, and data relating to one or more intersections involving the ray, e.g. an intersection distance and barycentric coordinates of an intersection point on a primitive. The data associated with a ray may also include the three sets of data mentioned above and described in detail below: the non-committed set, the candidate set and the committed set.

When the intersection testing module 106 has the ray data and the geometry data (e.g. the acceleration structure or the primitive data) then the intersection testing module performs intersection tests to determine whether the rays intersect the geometry. Methods for performing these intersection tests are known in the art, and the details of these methods are beyond the scope of this disclosure. In the example shown in FIG. 1 and described in detail herein, step S206 involves performing intersection testing on multiple rays in parallel. For example, the intersection testing module 106 may comprise one or more Single Instruction Multiple Data (SIMD) processing units configured to perform intersection testing for multiple rays in parallel with respect to the same piece of geometry. In examples described herein, the intersection testing module 106 is implemented in hardware, e.g. such that the traversal of the acceleration structure is performed using fixed function circuitry of the intersection testing module 106.

If the intersection testing module 106 determines that a ray intersects a node of the acceleration structure then information about the child nodes of the intersected node is passed back to the ray scheduler 114. The ray scheduler 114 will schedule intersection tests for the ray in respect of those child nodes of the intersected node. If the ray intersects a leaf node then the ray is tested for intersection with a primitive (e.g. a triangular primitive or a procedural primitive to just give two examples). If the ray is found to intersect with a primitive then the intersection distance of this intersection may be compared to one or more previously identified intersections in order to determine whether to accept the newly found intersection for the ray. This process is described in more detail below.

The result of performing step S206 for a ray is that the intersection testing module 106 has either: (i) identified the nearest intersection of the ray with a primitive that has not been identified as the nearest intersection in any previous intersection testing iterations for the ray, or (ii) determined that no such intersections exist for the ray. An indication of the result of step S206 for the ray (for a "done ray" as indicated in FIG. 1) is passed from the intersection testing module 106 to the task scheduling unit 110. It is noted that step S206 does not involve executing any shaders, e.g. traverse shaders. Indeed, the intersection testing module 106 might not be able to execute shader programs. In the example shown in FIG. 1, shader programs can be executed by the processing logic 108, not by the intersection testing module 106.

As described above, the order in which the ray is tested for intersection with primitives in a scene is non-deterministic. In particular, where the acceleration structure has a hierarchical tree structure, during the traversal of the acceleration structure in step S206, a ray can exist in multiple branches of the hierarchical tree structure simultaneously. This non-determinism in the order in which the ray is tested for intersection with primitives in the scene is due, at least in part, to the coherency gathering performed by the ray scheduler 114. However, since no shaders are executed in step S206 (in particular no traverse shaders are executed in step S206), step S206 does not cause non-determinism in the order in which shaders are executed. It can be appreciated that this coherency gathering can have huge benefits in terms of reducing the number of times that acceleration data is fetched from the memory 104 because each time the acceleration data is fetched it may be used for intersection testing in respect of a packet of rays, rather than just an individual ray. It is also noted that the acceleration structure typically has too much acceleration structure data for it all to be stored "on-chip" (i.e. on the ray tracing unit 102), so when intersection testing has been performed using a particular piece of acceleration structure data, it might not be stored permanently on the ray tracing unit, so if that particular piece of acceleration structure data is needed again for a subsequent intersection test then it may need to be fetched from the memory 104 again.

The task scheduling unit 110 determines which shader to execute in response to the result of the intersection testing performed in step S206. The task scheduling unit 110 can send shader tasks to the processing logic 108 to cause the processing logic 108 to execute shaders. In step S208 the task scheduling unit 110 determines whether a traverse shader is to be executed for the identified intersection. This determination is based on a characteristic of the primitive with which the ray is determined to intersect at the identified intersection.

For example, a first type of traverse shader is an any hit shader. A characteristic of the primitive may be whether the primitive is opaque. In step S208 it may be determined that an any hit shader is to be executed in respect of the identified intersection if the primitive is not opaque.

As another example, a second type of traverse shader is an intersection shader. A characteristic of the primitive may be whether the primitive is a procedural primitive. In step S208 it may be determined that an intersection shader is to be executed in respect of the identified intersection if the primitive is a procedural primitive. As described above, a procedural primitive is represented as a volume (e.g. with a simple shape, such as an axis-aligned bounding box) for the purposes of traversing the acceleration structure. If a ray is found to intersect with the volume representing procedural primitive, an intersection shader is executed in order to determine whether the ray truly intersects the primitive and if so, to determine details of the intersection (e.g. an intersection distance and barycentric coordinates).

A procedural primitive may be opaque or not opaque. A traverse shader to be executed in respect of an intersection with a non-opaque procedural primitive may have functionality of both an any hit shader and an intersection shader.

If it is determined in step S208 that a traverse shader is to be executed in respect of the identified intersection then the method passes to step S210.

If it is determined in step S208 that a traverse shader is not to be executed in respect of the identified intersection then the identified intersection is accepted and the intersection testing for the ray is complete. The method then passes to step S216, in which an output shader (e.g. a closest hit shader) is executed in respect of the accepted identified intersection.

In step S210 the processing logic 108 executes a traverse shader (e.g. an any hit shader or an intersection shader) in respect of the identified intersection. In examples described herein a traverse shader is executed in respect of an identified intersection for the ray in at least one intersection testing iteration.

In step S212, a result of the execution of the traverse shader is used to determine whether the ray intersects the primitive at the identified intersection. If the execution of the traverse shader determines that the ray does not intersect the primitive at the identified intersection, then the method passes from step S212 to step S214. In step S214, the data in the non-committed set, the candidate set and the committed set is updated for the next intersection testing iteration. In particular, if another intersection testing iteration is to be performed after a current intersection testing iteration then the method comprises (in step S214), before said another intersection testing iteration is performed: (i) copying data from the candidate set at the end of the current intersection testing iteration into the non-committed set; and subsequently copying data from the committed set at the end of the current intersection testing iteration into the candidate set. The method passes from step S214 back to step S206, thereby causing another intersection testing iteration to be performed for the ray.

If the execution of the traverse shader determines that the ray does intersect the primitive at the identified intersection, then the method passes from step S212 to step S216. As described above, in step S216, an output shader (e.g. a closest hit shader) is executed in respect of the accepted identified intersection. It is noted that step S216 is performed for the ray when the intersection testing for the ray is complete. In other words, when the intersection testing for the ray is complete, an output shader is executed to process a result of the intersection testing for the ray. The output shader may be a closest hit shader or a miss shader. A closest hit shader is executed in respect of the nearest accepted intersection found by performing the intersection testing for the ray. In this way, a closest hit shader may be used to determine output colour values, and may be executed after the closest intersected primitive has been found by the intersection testing process. A miss shader is used to determine how the system reacts if the ray is found to not intersect any primitives in the scene.

A result of executing the output shader is used for rendering an image of the 3D scene. For example, the result of the output shader may be a pixel value representing a colour of a pixel of the image of the scene.

If the traverse shader is an any hit shader then the execution of the any hit shader, in step S210, in respect of the identified intersection determines that either: (i) the identified intersection is accepted, such that in step S212 it is determined that the ray intersects the primitive at the identified intersection; or (ii) the identified intersection is discarded, such that in step S212 it is determined that the ray does not intersect the primitive at the identified intersection.

It can be understood from the description above that if it is determined (in step S212) during a current intersection testing iteration (a "first iteration"), that another intersection testing iteration (a "second iteration") is to be performed then in step S214 data relating to the identified intersection that was identified during the first iteration is stored for use in the second iteration. This stored data is used to avoid identifying the same intersection again in the second iteration. In other words, when another intersection testing iteration is caused, state data is stored for the ray (e.g. in the ray storage 116) to indicate the closest intersection that has been determined so far, so that on the next intersection testing iteration that intersection can be discounted, so that the same intersection is not found over and over again. This avoids a situation in which the method could get trapped in an infinite loop.

As described above, three sets of data are stored for the ray during intersection testing of the ray. The three sets of data comprise:
 (i) A candidate set which keeps track of the nearest intersection that has been identified so far for the ray during the traversal of the acceleration structure in a current intersection testing iteration. When a nearer valid intersection is found than the current candidate, the candidate set is updated. The candidate set can be updated during traversal by both opaque and non-opaque geometry. The candidate set can also be updated in step S214.
 (ii) A non-committed set which indicates a minimum intersection distance at which an intersection can be accepted as an identified intersection during the traversal of the acceleration structure in the current intersection testing iteration. For example, the non-committed set may store an indication of an identified intersection from a previous intersection testing iteration which was not accepted by a traverse shader. The non-committed set is used to step though primitives in order—one iteration finds the nearest primitive, if rejected, the next iteration finds the next nearest primitive, and so on. This helps to ensure that the shader order execution is deterministic even though the order in which rays are tested for intersection during the ray traversal is not deterministic. The non-committed set is like a lower bound on the search range, i.e. intersections with smaller intersection distances than an intersection distance indicated in the non-committed set will be discarded. The non-committed set is not updated during traversal of the acceleration structure (e.g. during step S206), but is updated in step S214 when a further iteration is to begin, and is set to the value of the candidate set from the previous iteration.
 (iii) A committed set which indicates a maximum intersection distance at which an intersection could be found by the intersection testing for the ray. For example, the committed set may store an indication of the nearest accepted hit. An accepted hit is either: (i) an intersection of the ray with a primitive for which a traverse shader is not to be executed, e.g. an opaque triangle, or (ii) an intersection for which the execution of a traverse shader has accepted the intersection. The committed set is like an upper bound on the search range, i.e. intersections with larger intersection distances than an intersection distance indicated in the committed set will be discarded. The committed set can be updated during traversal of the acceleration structure (e.g. during step S206) by finding nearer intersections with primitives for which a traverse shader is not to be executed.

An intersection testing iteration will identify the nearest intersection between an intersection distance indicated by the non-committed set and an intersection distance indicated by the committed set (if any), and store this identified nearest intersection in the candidate set.

Figure 3:
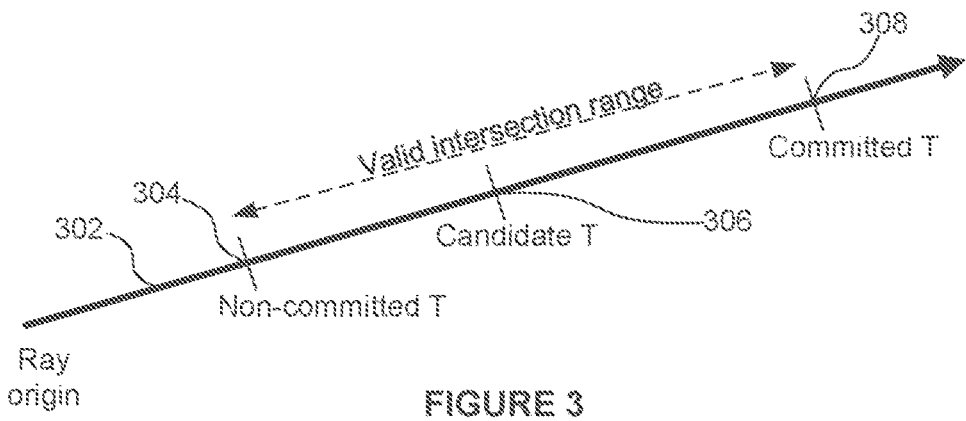
FIG. 3 shows a valid intersection range along a ray, and indicates a non-committed intersection distance, a candidate intersection distance and a committed intersection distance.

FIG. 3 illustrates a ray 302, r, which can be defined as r=O+TD where O is a vector which represents the ray origin, D is a vector which represents the ray direction and T represents a distance along the ray from the origin. FIG. 3 illustrates: a position (Non-committed T) 304 along the ray 302 at a distance from the ray origin which is indicated by the non-committed set of data; a position (Candidate T) 306 along the ray 302 at a distance from the ray origin which is indicated by the candidate set of data; and a position (Committed T) 308 along the ray 302 at a distance from the ray origin which is indicated by the committed set of data. The positions 304, 306 and 308 are shown at a particular point in time during an intersection testing iteration. At this particular point in time, there is a valid intersection range on the ray between the position 304 indicated by the non-committed set and the position 308 indicated by the committed set. If an intersection for the ray is found at this particular point in time within this valid intersection range then it may be an accepted intersection; whereas if an intersection for the ray is found at this particular point in time outside of this valid intersection range then it is not an accepted intersection for the ray, and can be discarded. The positions 304, 306 and 308 may vary over time as intersection testing is performed (e.g. the positions 306 and 308 of the candidate and committed sets may vary during the traversal of the acceleration structure in an intersection testing iteration, and all three of the positions 304, 306 and 308 of the non-committed, candidate and committed sets may vary from one intersection testing iteration to the next in step S214). Therefore, the valid intersection range for the ray 302 may vary during intersection testing.

The ray data for a ray includes a minimum culling distance and a maximum culling distance. The minimum culling distance may be represented as a value, $T_{min}$, wherein the ray (which is defined as O+TD) is not valid for values of T less than $T_{min}$. The maximum culling distance may be represented as a value, $T_{max}$, wherein the ray (which is defined as O+TD) is not valid for values of T greater than $T_{max}$. The values of $T_{min}$ and $T_{max}$ may be defined when a ray is generated (e.g. by a shader executed by the processing logic 108). At the start of an initial intersection testing iteration for the ray (i.e. at the start of the first iteration): (i) the minimum culling distance, $T_{min}$, for the ray is stored in the non-committed set for the ray, and (ii) the maximum culling distance, $T_{max}$, for the ray is stored in the candidate set and in the committed set for the ray.

Each of the three sets of data (i.e. the non-committed set, the candidate set and the committed set) comprises:

- A distance indication to indicate a distance along the ray. This can be represented as a value of T. If the set of data is associated with an intersection then the value of T represents the intersection distance of the intersection.
- A type of data set. The type can indicate one of four things:
  - "None"—this means that the data set does not relate to an intersection of the ray with a primitive, i.e. a primitive has not been found for the set yet. With a type of "None", the distance T in the set is still valid and will be set to either $T_{min}$ or $T_{max}$ depending on the set as described above.
  - "Triangle"—this means that the data set does relate to an intersection of the ray with a primitive, and that primitive is of triangle geometry type.
  - "Procedural"—this means that the data set does relate to an intersection of the ray with a primitive, and that primitive is of procedural geometry type.
  - "ProceduralPartial"—this means that the data set does relate to an intersection of the ray with a primitive, and that primitive is a procedural primitive with the start of a valid range of the ray being inside the box. This type is used to handle an edge case described in more detail below.
- An opacity indication to indicate whether an associated primitive is opaque. When the data set relates to an intersection of the ray with a primitive, the opacity indication indicates an opacity of the primitive. The opacity indication is valid only when the type is not equal to None.
- A set of indices. When the data set relates to an intersection of the ray with a primitive, these indices (e.g. three indices) can be used as a unique identifier of the intersected primitive. The set of indices is valid only when the type is not equal to None. These indices may comprise:
  - An instance index. One or more instances of geometry may be placed within the scene to be rendered. The instance index indicates an ID associated with the instance of geometry that the intersected primitive is part of. As an example, the Vulkan specification states that there can be, at most, $2^{24}-1$ instances of geometry in a scene, so the instance index may have 24 bits such that each instance of geometry within a scene can have a unique instance index.
  - A geometry index. An instance of geometry may comprise one or more items of geometry. The geometry index indicates an ID associated with the item of geometry that the intersected primitive is part of. As an example, the Vulkan specification states that there can be, at most, $2^{24}-1$ items of geometry within an instance so the geometry index may have 24 bits such that each item of geometry within an instance can have a unique geometry index.
  - A primitive index. An item of geometry may comprise one or more primitives. The primitive index indicates an ID associated with the intersected primitive. As an example, the Vulkan specification states that there can be, at most, $2^{29}-1$ primitives within an item of geometry so the primitive index may have 29 bits such that each primitive within an item of geometry can have a unique primitive index.

So to summarise the above, each of the sets of data (non-committed set, candidate set and committed set) comprises: an indication of a distance along the ray, and if the set of data relates to an intersection of the ray with a particular primitive then the set of data comprises: (i) an indication of a type of the particular primitive, (ii) an indication of an opacity of the particular primitive, and (iii) one or more indices associated with the particular primitive, wherein the one or more indices comprise an instance index, a geometry index and a primitive index associated with the particular primitive. The sets of data may comprise other data, such as barycentric coordinates for an intersection point and an indication of whether an intersection is with a front-facing side or a back-facing side of a primitive.

During the traversal of the acceleration structure in an intersection testing iteration, in response to finding an intersection of the ray with a primitive: (a) the candidate set is updated to be associated with the found intersection if the found intersection is nearer than the current nearest intersection indicated by the data in the candidate set, and (b) the committed set is updated to be associated with the found intersection if: (i) the found intersection is nearer than the maximum intersection distance indicated by the data in the committed set, (ii) the primitive is opaque, and (iii) the primitive is not a procedural primitive. It is noted that the candidate set can be updated by both opaque and non-opaque geometry.

Figure 4:
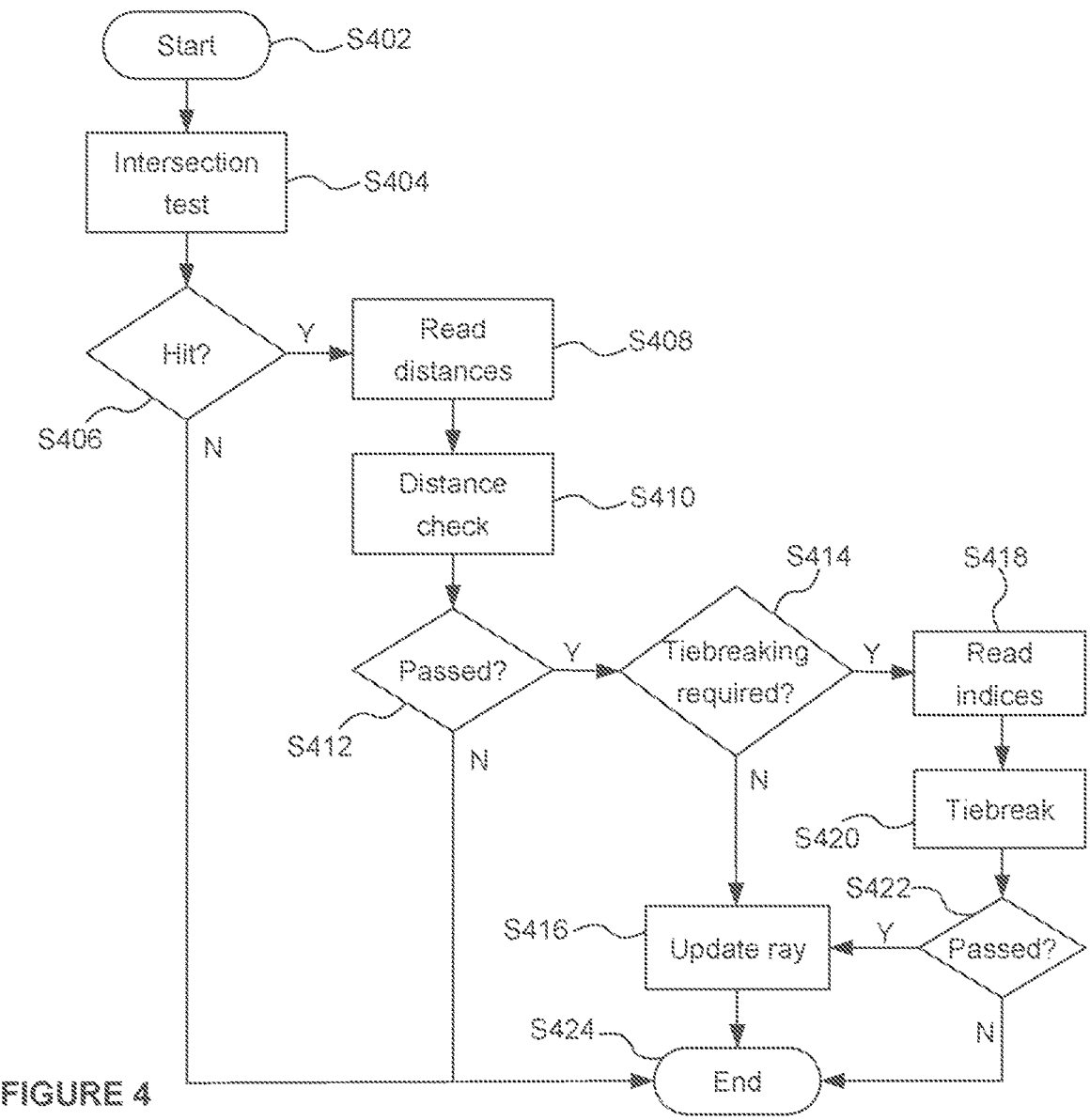
FIG. 4 shows a flow chart for a method of performing intersection testing for a ray with respect to a primitive.

FIG. 4 is a flow chart for a method of performing intersection testing for a ray with respect to a primitive, which illustrates how the ray tracing unit determines whether to update the ray data in the candidate set in response to finding in intersection with the primitive for the ray. A similar method may be performed to determine whether to update the ray data in the committed set in response to finding in intersection of the ray with an opaque primitive with the "Triangle" type. The method shown in FIG. 4 may be part of step S206. The method shown in FIG. 4 may be implemented by the intersection testing module 106.

The method starts at S402. In step S404 the intersection testing module 106 performs an intersection test to determine whether the ray intersects the primitive. If the ray does intersect the primitive then the intersection test of step S404 involves determining an intersection distance (e.g. indicated by a T value of $T_{int}$) along the ray at which the intersection occurs. As described above, methods for performing this intersection test are known in the art, and may be implemented in fixed function circuitry in the intersection testing module 106. In step S406 it is determined whether the intersection test in step S404 determined that the ray intersects the primitive. If it is determined that the ray does not intersect the primitive then the method passes from step S406 to S424 at which point the method shown in FIG. 4 ends. However, if it is determined that the ray does intersect the primitive then the method passes from step S406 to step S408.

In step S408 the T value stored in the candidate set (referred to here as $T_{CD}$) is read from the ray storage. In step S410 the values of $T_{int}$ and $T_{CD}$ are compared, thereby performing a distance check. In step S412 it is determined whether the intersection has passed the distance check. In particular, if the intersection of the ray with the primitive is at a position which is further along the ray than the position indicated in the candidate set (i.e. if $T_{int} > T_{CD}$) then the intersection found in step S404 will not update the candidate set (i.e. the distance check is failed), so the method passes to S424 such that the method of FIG. 4 ends. However, if the intersection of the ray with the primitive is at a position which is not further along the ray than the position indicated in the candidate set (i.e. if $T_{int} \leq T_{CD}$) then the intersection found in step S404 may update the candidate set (i.e. the distance check is passed), so the method passes to step S414.

In step S414 it is determined whether tiebreaking is required. In particular, a tie occurs if the intersection of the ray with the primitive is at a position which is the same distance along the ray as the position indicated in the candidate set (i.e. if $T_{int} = T_{CD}$). If tiebreaking is not to be performed, i.e. if the intersection of the ray with the primitive is at a position which is less far along the ray than the position indicated in the candidate set (i.e. if $T_{int} < T_{CD}$) then the method passes from step S414 to step S416. In step S416 the candidate set is updated to store data relating to the intersection found in step S404. After step S416 the method passes to S424 such that the method of FIG. 4 ends.

If tiebreaking is to be performed, i.e. if the intersection of the ray with the primitive is at the same distance along the ray as the position indicated in the candidate set (i.e. if $T_{int} = T_{CD}$) then the method passes from step S414 to step S418. The method described herein ensures that the shader execution order is deterministic even when the intersection distances are equal for multiple intersections for the ray (e.g. for intersections of the ray with multiple primitives). In particular, equal intersection distances are resolved using unique primitive identifiers for respective primitives so that the primitives can be ordered using the unique primitive identifiers. For example, the unique primitive identifier for a primitive may be a compound value made up of three values: the primitive index, the geometry index and the instance index for the primitive. These values provide a unique identifier together, but not alone. So in step S418 the three indices (the primitive index, the geometry index and the instance index) are read for the two primitives in question (i.e. the primitive that the ray has been found to intersect with in the current intersection iteration, and the primitive associated with the candidate set).

In step S420 the tiebreak procedure is performed, thereby comparing the indices for the two primitives in question. The three IDs can be thought of as a longer integer which is a concatenation of the three fields, e.g.: instance_Index|geometry_Index|primitive_Index. The concatenation of the three fields is unique to a primitive in the scene, and so the results of the concatenations of the three fields can be used as the unique primitive identifiers of the primitives. In other examples, the three fields may be concatenated in a different order, or may be combined in some other way (e.g. using an operation other than a concatenation) to determine the unique primitive identifiers. The unique primitive identifiers can be compared like any other integer to resolve which primitive is closer. As an example, for two primitives which have equal intersection distances along a ray, a smaller primitive identifier can be considered to represent a "nearer" primitive. In another example, for two primitives which have equal intersection distances along a ray, a larger primitive identifier can be considered to represent a "nearer" primitive. Whichever example is used, so long as it is consistently used, since the primitive identifier is unique, the same primitive is consistently found as the "nearer" of the two primitives regardless of the order of intersection. This maintains a deterministic order of shader execution. It is the determinism of the order of shader execution, rather than a specific order itself, which is required by the ray tracing standards mentioned above.

In summary of the tiebreaking procedure, if during the traversal of the acceleration structure, in response to finding an intersection for the ray with the particular primitive at an intersection distance that is equal to an intersection distance of a previous intersection for the ray with another primitive (where the previous intersection is indicated by the data in the candidate set): (i) a unique primitive identifier for the particular primitive is compared with a unique primitive identifier for the other primitive, and (ii) it is determined whether to treat the found intersection as nearer than the previous intersection based on the result of the comparison of the unique primitive identifiers. As mentioned above, the unique primitive identifier for a primitive is based on the one or more indices. In particular, the unique identifier for the particular primitive may be determined using a concatenation of the instance index, the geometry index and the primitive index associated with the particular primitive, and the unique identifier for the other primitive may be determined using a concatenation of an instance index, a geometry index and a primitive index associated with the other primitive.

Step S418 involves reading values (e.g. the values of the instance index, geometry index and primitive index of the candidate set) from the ray storage 116 in order to perform the comparisons of the primitive identifiers. Reading these values can be a high bandwidth operation. Therefore, in this method, these values are read and used to form the unique primitive identifiers only when it is determined (in step S414) that tiebreaking required (i.e. when the intersection distance for a newly found intersection is equal to the intersection distance stored in the candidate set).

In step S422 it is determined whether the tiebreak procedure has been passed. If the tiebreak procedure was passed (e.g. if the unique primitive identifier for the intersected primitive that has been found in the current intersection testing iteration is less than (or greater than, in an alternative example) the unique primitive identifier formed from the indices read from the candidate set) then the method passes from step S422 to step S416. As described above, in step S416 the candidate set is updated to store data relating to the intersection found in step S404. After step S416 the method passes to S424 such that the method of FIG. 4 ends. However, if the tiebreak procedure was failed (e.g. if the unique primitive identifier for the intersected primitive that has been found in the current intersection testing iteration is greater than (or less than, in an alternative example) the unique primitive identifier formed from the indices read from the candidate set) then the method passes from step S422 to S424 such that the method of FIG. 4 ends without updating the data in candidate set.

Steps S408 to S422 may be performed by a primitive update module, which may (or may not) be part of the intersection testing module 106. The primitive update module performs steps S408 to S422 to determine whether or not an intersection should be saved. The method described above with reference to FIG. 4 is for updating the candidate set during the traversal of the acceleration structure in step S206 when the ray intersects a primitive at an intersection distance ($T_{int}$) which is in the range $T_{NCM}<T_{int}<T_{CD}$. A similar method can be used to update the committed set during the traversal of the acceleration structure in step S206 when the ray intersects an opaque triangle at an intersection distance ($T_{int}$) which is in the range $T_{NCM}<T_{int}<T_{CM}$.

Figure 5:
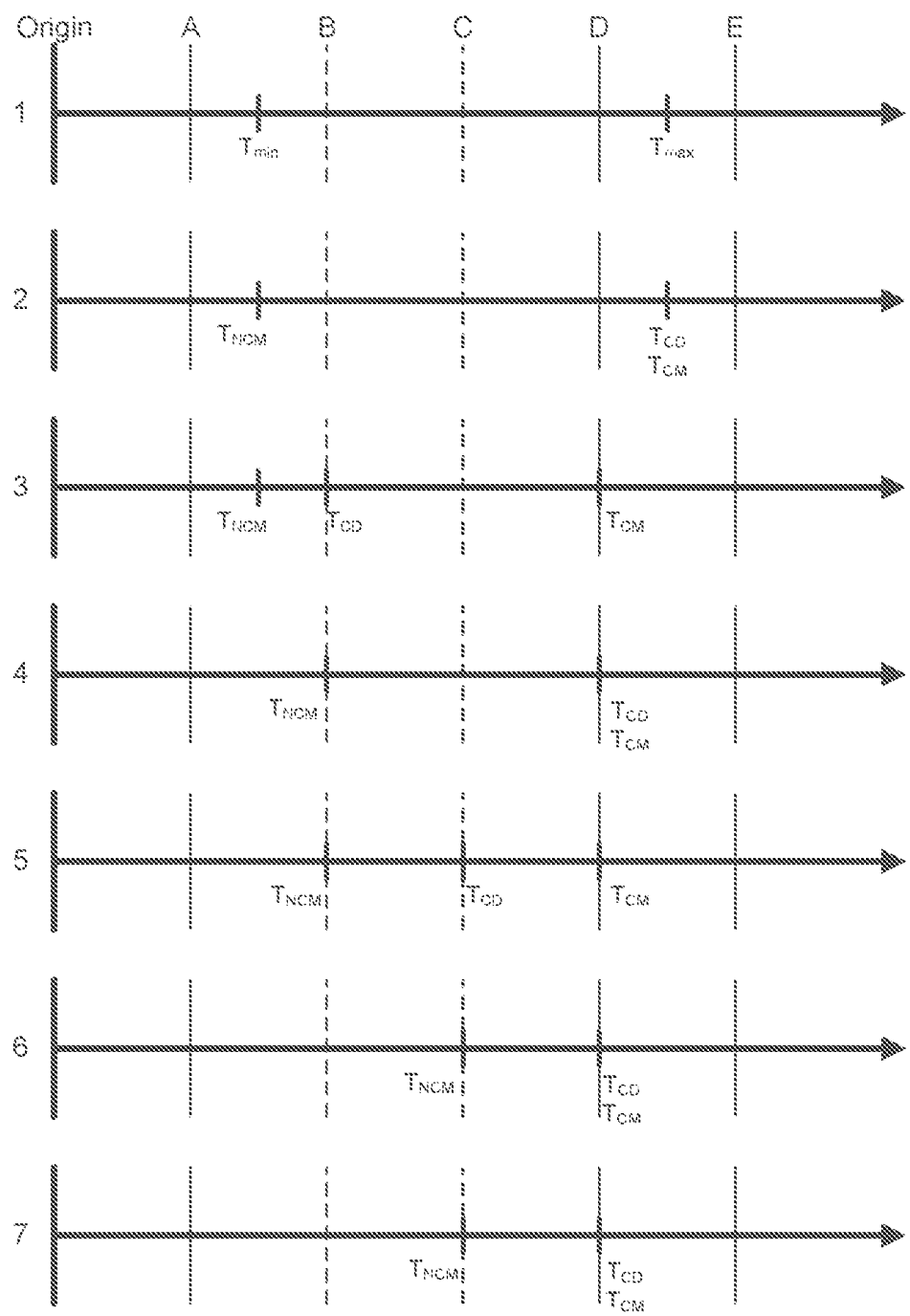
FIG. 5 shows how the non-committed intersection distance, the candidate intersection distance and the committed intersection distance vary over a sequence of intersection testing iterations in a first example in which a ray intersects a set of primitives, a subset of which are opaque.

FIG. 5 shows an example to illustrate how the non-committed intersection distance, the candidate intersection distance and the committed intersection distance vary, at seven different points in time, over a sequence of three intersection testing iterations. In this example, a ray intersects a set of five primitives (labelled A, B, C, D and E). All five of these primitives are triangular primitives (i.e. not procedural primitives). A subset of the five primitives are opaque, whilst the others are not opaque. In particular, primitives A, D and E are opaque triangles (shown with solid vertical lines in FIG. 5), whereas primitives B and C are non-opaque triangles (shown with dashed vertical lines in FIG. 5). As described above, an any hit shader may be executed in response to finding an intersection of a ray with a non-opaque triangle, but not in response to finding an intersection of a ray with an opaque triangle. In the example shown in FIG. 5, the ray is represented by the horizontal arrow. Looking from the ray origin, the ray intersects primitives A, B, C, D and E in that order.

The top diagram of FIG. 5 (diagram 1) shows the ray as it is originally loaded having values for the origin, direction, minimum culling distance ($T_{min}$), and maximum culling distance ($T_{max}$) provided by a shader which generated the ray (e.g. a ray generation shader or a closest hit shader or a miss shader). It is noted that the distance from the ray origin indicated by the minimum culling distance ($T_{min}$) is at a position between primitives A and B. The distance from the ray origin indicated by the maximum culling distance ($T_{max}$) is at a position between primitives D and E.

Diagram 2 of FIG. 5 shows how the candidate set, non-committed set and the committed set are initialised based on the values of $T_{min}$ and $T_{max}$ for the first intersection testing iteration (in step S204). In particular, the value of $T_{min}$ is loaded into the non-committed set (as $T_{NCM}$), and the value of $T_{max}$ is loaded into the candidate set (as $T_{CD}$) and into the committed set (as $T_{CM}$). At this initial point (i.e. before the first intersection testing iteration has been performed) all three of the data sets will initially have a type of NONE indicating there is no associated primitive yet and they just have hit-distances (T) at this point. The committed and candidate data sets are loaded to be the same as each other initially. An intersection testing iteration is then performed (e.g. in step S206 to S212) to find the closest intersection of the ray with one of the primitives.

In this example, the first intersection testing iteration finds (in step S206) that the nearest primitive is primitive B. Whilst primitive A is closer than primitive B, primitive A has an intersection distance that is smaller than the distance in the non-committed set ($T_{NCM}$) so is therefore not considered. Diagram 3 of FIG. 5 shows the distances ($T_{NCM}$, $T_{CD}$ and $T_{CM}$) in the three sets at the end of the first intersection testing iteration. In particular, the value of $T_{NCM}$ is not updated during the intersection testing iteration so it stays equal to $T_{min}$; the value of $T_{CD}$ is the intersection distance of the primitive B ($T_B$) because primitive B is the closest primitive that the ray is found to intersect with; and the value of $T_{CM}$ is the intersection distance of the primitive D ($T_D$) because primitive D is the closest opaque triangle that the ray is found to intersect with. Primitive B is non-opaque so a traverse shader (in particular an any hit shader) is executed (in step S210) for the intersection of the ray with primitive B. If the any hit shader accepts this intersection then the method passes to step S216 and an output shader (in particular a closest hit shader) would then be executed in respect of the intersection of the ray with the primitive B, and this would be the end of the processing for this ray. However, in the example shown in FIG. 5, the any hit shader for the ray in respect of primitive B does not accept the intersection, so another intersection testing iteration is to be performed.

In step S214 the candidate data set (which relates to the intersection with primitive B) is copied to the non-committed data set, and the committed data set (which relates to the intersection with primitive D) is copied to the candidate data set. Therefore, as shown in Diagram 4 of FIG. 5, the value of $T_{NCM}$ is updated to be the intersection distance of the primitive B ($T_B$) because this is what was in the candidate set in diagram 3; the value of $T_{CD}$ is updated to be the intersection distance of the primitive D ($T_D$) because this is what was in the committed set in diagram 3; and the value of $T_{CM}$ stays the same as diagram 3, so it is still the intersection distance of the primitive D ($T_D$). Then a second intersection testing iteration is performed (e.g. in steps S206 to S212).

In this example, the second intersection testing iteration finds (in step S206) that the nearest primitive (which has not been identified in a previous intersection testing iteration) is primitive C. Primitive A is closer than primitive C, but primitive A has an intersection distance that is smaller than the distance in the non-committed set ($T_{NCM}$) so is therefore not considered. Furthermore, since the non-committed set relates to the intersection with primitive B, when the intersection with primitive B is considered in the second intersection testing iteration, the tiebreaking procedure will ensure that primitive B is not found again in the second intersection testing iteration. Diagram 5 of FIG. 5 shows the distances ($T_{NCM}$, $T_{CD}$ and $T_{CM}$) in the three sets at the end of the second intersection testing iteration. In particular, the value of $T_{NCM}$ is not updated during the intersection testing iteration so it stays equal to $T_B$; the value of $T_{CD}$ is the intersection distance of the primitive C ($T_C$) because primitive C is the closest primitive that the ray is found to intersect with (which has not been identified in a previous intersection testing iteration); and the value of $T_{CM}$ is still the intersection distance of the primitive D ($T_D$) because primitive D is the closest opaque triangle that the ray is found to intersect with. Primitive C is non-opaque so a traverse shader (in particular an any hit shader) is executed (in step S210) for the intersection of the ray with primitive C. If the any hit shader accepts this intersection then the method passes to step S216 and an output shader (in particular a closest hit shader) would then be executed in respect of the intersection of the ray with the primitive C, and this would be the end of the processing for this ray. However, in the example shown in FIG. 5, the any hit shader for the ray in respect of primitive C does not accept the intersection, so another intersection testing iteration is to be performed.

In step S214 the candidate data set (which relates to the intersection with primitive C) is copied to the non-committed data set, and the committed data set (which relates to the intersection with primitive D) is copied to the candidate data set. Therefore, as shown in Diagram 6 of FIG. 5, the value of $T_{NCM}$ is updated to be the intersection distance of the primitive C ($T_C$) because this is what was in the candidate set in diagram 5; the value of $T_{CD}$ is updated to be the intersection distance of the primitive D ($T_D$) because this is what was in the committed set in diagram 5; and the value of $T_{CM}$ stays the same as diagram 5, so it is still the intersection distance of the primitive D ($T_D$). Then a third intersection testing iteration is performed (e.g. in steps S206 to S212).

In this example, the third intersection testing iteration finds (in step S206) that the nearest primitive (which has not been identified in a previous intersection testing iteration) is primitive D. Primitives A and B are closer than primitive D, but primitives A and B have intersection distances that are smaller than the distance in the non-committed set ($T_{NCM}$) so are therefore not considered. Furthermore, since the non-committed set relates to the intersection with primitive C, when the intersection with primitive C is considered in the third intersection testing iteration, the tiebreaking procedure will ensure that primitive C is not found again in the third intersection testing iteration. Diagram 7 of FIG. 5 shows the distances ($T_{NCM}$, $T_{CD}$ and $T_{CM}$) in the three sets at the end of the third intersection testing iteration. In particular, the value of $T_{NCM}$ is not updated during the intersection testing iteration so it stays equal to $T_C$; the value of $T_{CD}$ is still the intersection distance of the primitive D ($T_D$) because primitive D is the closest primitive that the ray is found to intersect with (which has not been identified in a previous intersection testing iteration); and the value of $T_{CM}$ is still the intersection distance of the primitive D ($T_D$) because primitive D is the closest opaque triangle that the ray is found to intersect with. Primitive D is opaque so a traverse shader is not executed. The method passes to step S216 and an output shader (in particular a closest hit shader) would then be executed in respect of the intersection of the ray with the primitive D, and this is the end of the processing for this ray.

Figure 6:
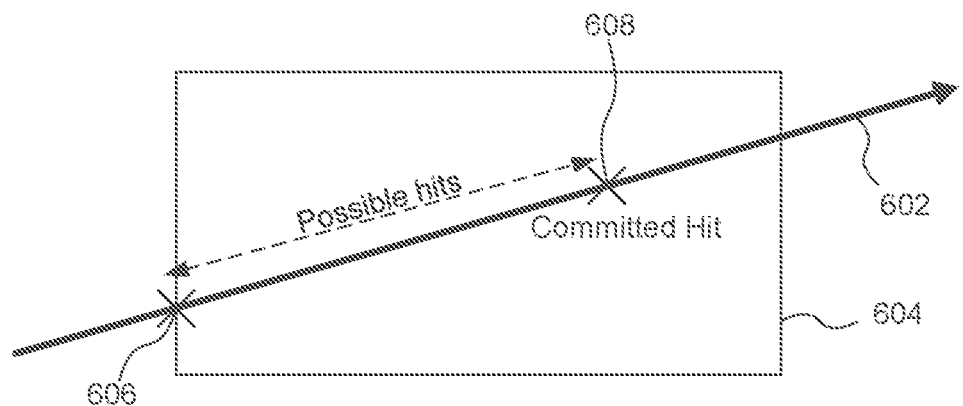
FIG. 6 illustrates a ray intersecting with a procedural primitive, showing the position of a committed hit within the procedural primitive.

Procedural primitives need to be treated carefully. FIG. 6 illustrates a ray 602 intersecting with a procedural primitive 604. As described above, the procedural primitive is represented as a volume (e.g. an axis-aligned bounding box (AABB)), for the purposes of the intersection testing performed by the intersection testing module 106. When a ray is determined to intersect with a procedural primitive then the intersection testing module will set the intersection distance to be the closest position (i.e. the position on the ray with the smallest T value) at which the ray intersects the volume representing the procedural primitive. For example, the intersection testing module 106 will identify an intersection between the ray 602 and the procedural primitive 604 at position 606. In other words, the identified intersection of the ray with the procedural primitive is at a position which is a minimum distance along the ray at which the ray is valid and at which the ray intersects the volume representing the procedural primitive. A traverse shader (in particular an intersection shader) will be executed in respect of the intersection to determine a committed intersection position (608) between the ray 602 and the procedural primitive 604. The intersection shader may determine the committed intersection position 608 at any point within the procedural primitive. In some examples, the intersection shader may determine that the ray does not intersect the procedural primitive, such that no committed intersection position is identified.

When a ray intersects a procedural primitive and an intersection shader identifies a committed intersection then another intersection testing iteration is performed because it is possible that there may be an intersection for the ray with a different primitive at a position between the front of the AABB (at position 606) and the committed intersection position (position 608). So another intersection testing iteration is performed to check whether this is the case.

The execution of the intersection shader in respect of an identified intersection (e.g. at position 606) may determine that the ray intersects the primitive at a further position (e.g. 608) within the volume representing the procedural primitive 604 which is different to the position of the identified intersection (e.g. 606). In this case the intersection shader can be considered to determine that the ray 602 does not intersect the primitive 604 at the identified intersection (at position 606). Furthermore, the execution of the intersection shader in respect of an identified intersection (e.g. at position 606) may determine that the ray does not intersect the primitive within the volume of the procedural primitive 604, such that the ray does not intersect the primitive at the identified intersection. In both of these situations the traverse shader (i.e. the intersection shader) has determined that the ray does not intersect the primitive at the identified intersection such that another intersection testing iteration is to be performed. In some examples, another intersection testing iteration is performed following the execution of an intersection shader irrespective of the result of the intersection shader. In other examples, a check could be performed to see whether the execution of the intersection shader has identified an intersection exactly at the position of the identified intersection (606), e.g. right on the front edge of the AABB of the procedural primitive 604. If this check determines that the intersection shader has identified an intersection exactly at the position of the identified intersection (606) then a further intersection testing iteration might not be performed, whereas if check determines that the intersection shader has not identified an intersection exactly at the position of the identified intersection (606) then a further intersection testing iteration is performed.

Figure 7:
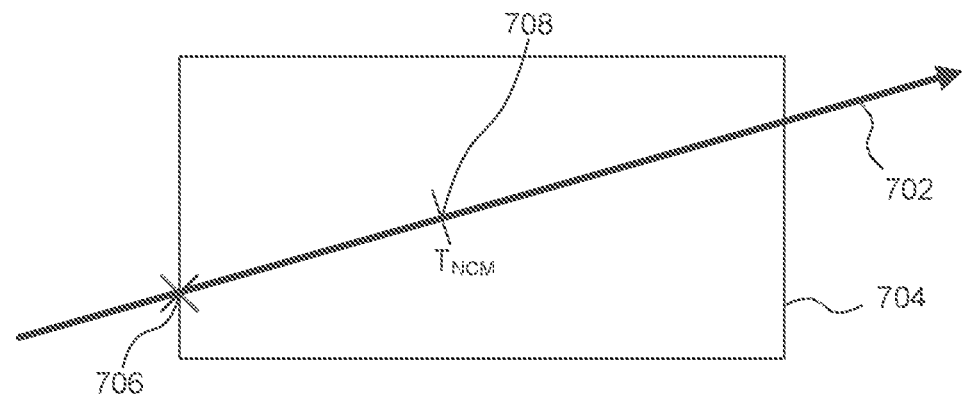
FIG. 7 illustrates a ray intersecting with a procedural primitive in a situation in which a position on the ray at the non-committed intersection distance is within the procedural primitive.

FIG. 7 illustrates a ray 702 intersecting with a procedural primitive 704. The ray 702 first intersects the procedural primitive 704 at a position 706 on the front face of the procedural primitive. In the example, shown in FIG. 7, the non-committed set of data stores an intersection distance ($T_{NCM}$) which corresponds to a position 708 on the ray 702 which is within the procedural primitive 704. A simple distance check performed on the non-committed set of data may reject intersections that have smaller T values than $T_{NCM}$, so there is a risk that procedural primitives such as 704 may be rejected even though it is possible for the ray to validly intersect with the procedural primitive 704 (because some positions within the AABB for the procedural primitive 704 have T values greater than $T_{NCM}$). As described below, we can use a special case to avoid this problem whereby a "ProceduralPartial" primitive type is used. However, if these procedural primitives are not rejected then in the situation shown in FIG. 7, if care is not taken, there is a possibility for the value of $T_{NCM}$ to decrease. To avoid a possibility to get stuck in an infinite loop with the intersection testing iterations, the value of $T_{NCM}$ should not decrease at any point within the processing of a ray. In particular, the intersection testing module 106 will report an intersection distance for an intersection between the ray 702 and the procedural primitive 704 at the position 706 on the front of the box, so it is possible to hit a procedural primitive whose T value is less than $T_{NCM}$. This can still be a valid intersection if $T_{NCM}$ is inside the box.

In the diagram shown in FIG. 7, if the procedural primitive 704 was identified in a first intersection testing iteration, and if $T_{NCM}$ was updated with the data in the candidate set at the end of the first intersection testing iteration then this would decrease the value of $T_{NCM}$. To avoid this, the "ProceduralPartial" primitive type is used. As described above, the three sets of data (candidate set, non-committed set and committed set) have a "type" indication, and this may be set to "ProceduralPartial".

In this situation, some clamping may be introduced before the distance check (e.g. between steps S408 and S410). A current intersection with a procedural primitive is identified at $T_{int}$ at the front face of the procedural primitive (e.g. at position 706). The values of $T_{NCM}$ and the type indication (Type$_{NCM}$) are read for the non-committed set. If [($T_{int} < T_{NCM}$) AND (Type$_{NCM}$ is "None" OR Type$_{NCM}$ is "Procedural Partial")] then two things happen: (i) the value of $T_{int}$ is set to be equal to the value of $T_{NCM}$, and (ii) the type of the primitive of the current intersection is set to "ProceduralPartial". So if, during the traversal of the acceleration structure, (i) an intersection is found with a procedural primitive, and (ii) a position at said minimum intersection distance along the ray at which an intersection can be accepted as an identified intersection during the traversal of the acceleration structure in the current intersection testing iteration is within the procedural primitive, then the found intersection is determined to be at said minimum intersection distance along the ray during the traversal of the acceleration structure.

The effect of this is that on the first intersection testing iteration for the situation shown in FIG. 7, the intersection distance is clamped to $T_{NCM}$ (at position 708) rather than being found at position 706. If this results in multiple intersections having the same intersection distance ($T_{NCM}$) then they will be deterministically sorted using the tiebreaking procedure described above in which the intersections are sorted based on the unique primitive identifiers of the primitives associated with the intersections. On iterations after the first intersection testing iteration, where a previous intersection has the type "ProceduralPartial", the intersection distance is also clamped to maintain the same sorting order.

Figure 8A:
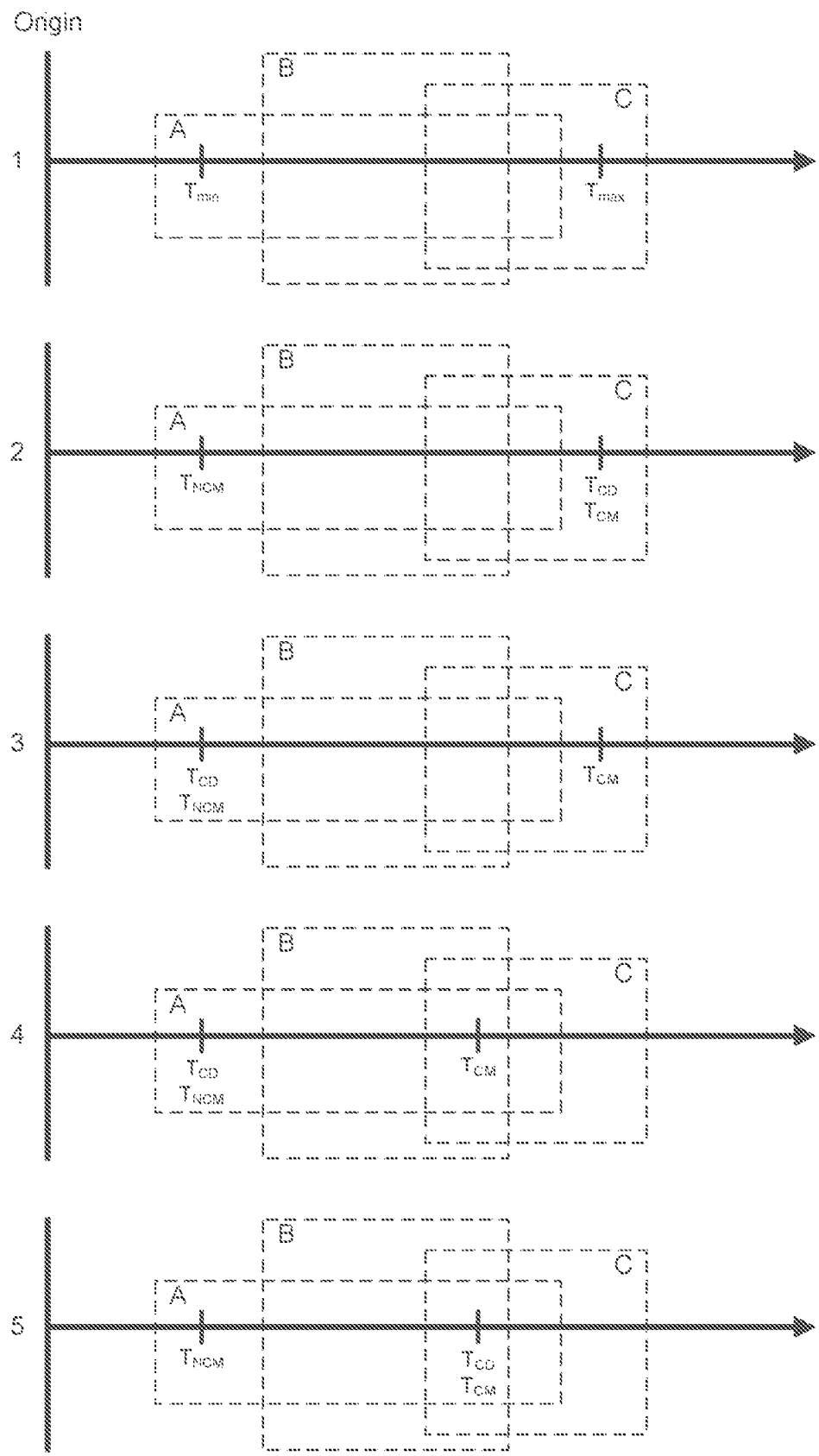
FIGS. 8*a* and 8*b* show how the non-committed intersection distance, the candidate intersection distance and the committed intersection distance vary over a sequence of intersection testing iterations in a second example in which a ray intersects a set of partially overlapping procedural primitives.
Figure 8B:
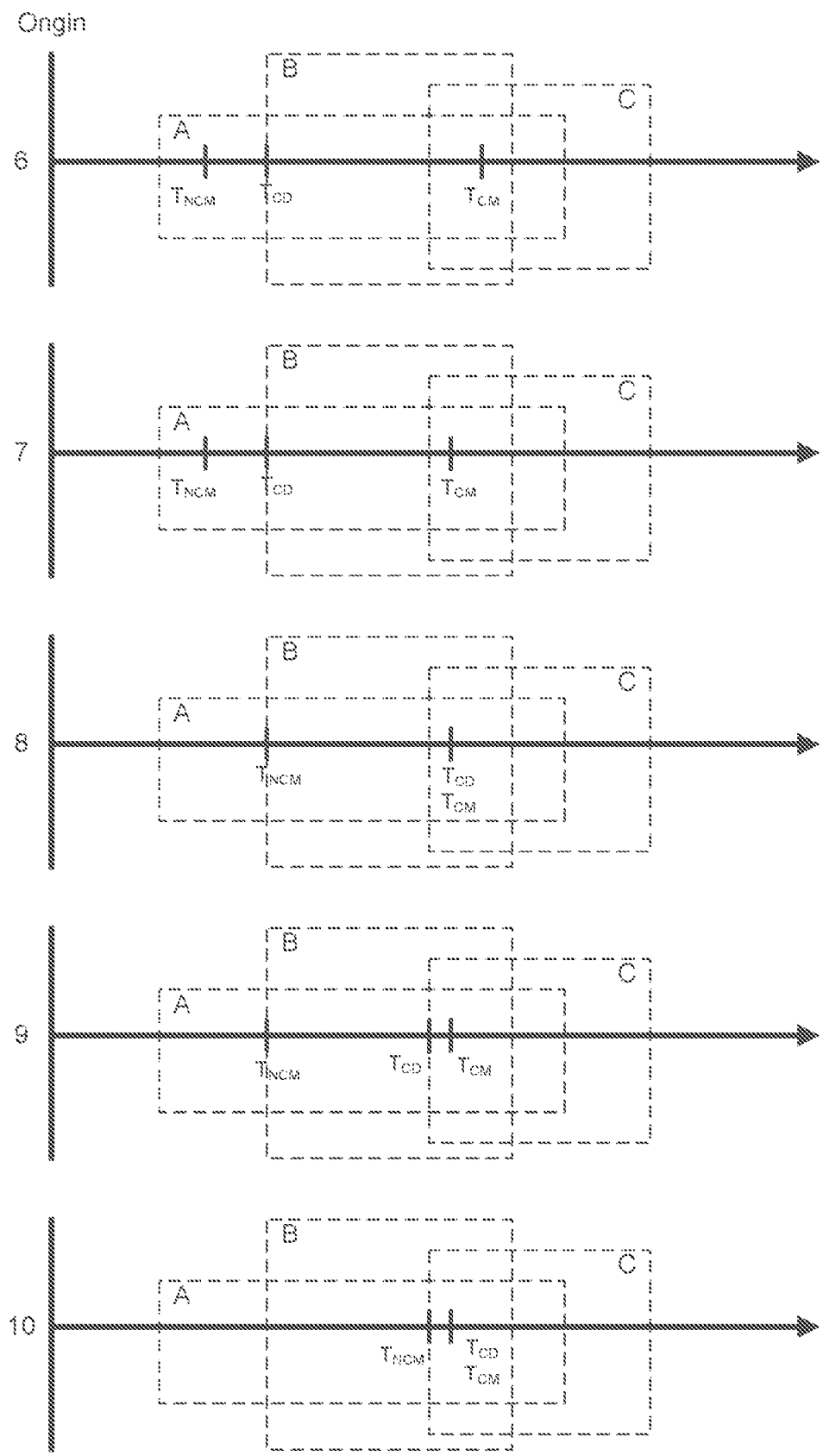

FIGS. 8a and 8b show an example to illustrate how the non-committed intersection distance, the candidate intersection distance and the committed intersection distance vary, at ten different points in time, over a sequence of four intersection testing iterations. In this example, a ray intersects a set of three partially overlapping procedural primitives (which are represented as boxes, labelled A, B and C in FIGS. 8a and 8b). As described above, an intersection shader may be executed in response to finding an intersection of a ray with a procedural primitive. Whether the procedural primitives are opaque or not will not change the control flow; it would just influence the behaviour of the intersection shaders that are executed. In the example shown in FIGS. 8a and 8b, the ray is represented by the horizontal arrow.

The top diagram of FIG. 8a (diagram 1) shows the ray as it is originally loaded having values for the origin, direction, minimum culling distance ($T_{min}$), and maximum culling distance ($T_{max}$) provided by a shader which generated the ray (e.g. a ray generation shader or a closest hit shader or a miss shader). It is noted that the distance from the ray origin indicated by the minimum culling distance ($T_{min}$) is at a position within the volume of the procedural primitive A, but not within the volumes of the procedural primitives B and C. The distance from the ray origin indicated by the maximum culling distance ($T_{max}$) is at a position within the volume of the procedural primitive C, but not within the volumes of the procedural primitives A and B.

Diagram 2 of FIG. 8a shows how the candidate set, non-committed set and the committed set are initialised based on the values of $T_{min}$ and $T_{max}$ for the first intersection testing iteration (in step S204). In particular, the value of $T_{min}$ is loaded into the non-committed set (as $T_{NCM}$), and the value of $T_{max}$ is loaded into the candidate set (as $T_{CD}$) and into the committed set (as $T_{CM}$). At this initial point (i.e. before the first intersection testing iteration has been performed) all three of the data sets will initially have a type of NONE indicating there is no associated primitive yet and they just have hit-distances (T) at this point. The committed and candidate data sets are loaded to be the same as each other initially. An intersection testing iteration is then performed (e.g. in step S206 to S212) to find the closest intersection of the ray with one of the primitives.

In this example, the first intersection testing iteration finds (in step S206) that the nearest primitive is procedural primitive A. The value of $T_{NCM}$ represents a position that is within the volume representing procedural primitive A, so the intersection distance of the intersection of the ray with the primitive A is set to be equal to $T_{NCM}$. Diagram 3 of FIG. 8a shows the distances ($T_{NCM}$, $T_{CD}$ and $T_{CM}$) in the three sets at the end of the traversal of the acceleration structure in step S206 of the first intersection testing iteration. In particular, the value of $T_{NCM}$ is not updated during this traversal of the acceleration structure so it stays equal to $T_{min}$; the value of $T_{CD}$ has been clamped to be equal to $T_{NCM}$ (i.e. equal to $T_{min}$); and the ray has not been found to intersect with any opaque triangles so the value of $T_{CM}$ is not updated during this traversal of the acceleration structure so it stays equal to $T_{max}$. Primitive A is a procedural primitive so a traverse shader (e.g. an intersection shader if procedural primitive A is opaque, or a shader with combined functionality of an intersection shader and an any hit shader if procedural primitive A is not opaque) is executed.

In the example shown in FIG. 8a, the execution of the intersection shader in respect of the intersection of the ray with procedural primitive A commits an intersection that is at a position within all three of the procedural primitives A, B and C. It is possible that multiple intersections (or no intersections) could be committed by the intersection shader, but the last committed intersection (if any) would remain associated with the committed set at the end of the execution of the intersection shader. Diagram 4 of FIG. 8a shows the distances ($T_{NCM}$, $T_{CD}$ and $T_{CM}$) in the three sets at the end of the first intersection testing iteration, i.e. after the execution of the intersection shader in respect of primitive A. In particular, the values of $T_{NCM}$ and $T_{CD}$ are not updated by the execution of the intersection shader so they stay the same as in Diagram 3 of FIG. 8a; but the value of $T_{CM}$ is updated by the execution of the intersection shader.

In step S214 the candidate data set is copied to the non-committed data set, and the committed data set is copied to the candidate data set. Therefore, as shown in Diagram 5 of FIG. 8a, the value of $T_{NCM}$ is still equal to $T_{min}$, and the value of $T_{CD}$ is updated to be the same as the committed intersection distance that was found by the execution of the intersection shader in respect of primitive A. Then a second intersection testing iteration is performed (e.g. in steps S206 to S212).

In this example, the second intersection testing iteration finds (in step S206) that the nearest primitive (which has not been identified in a previous intersection testing iteration) is procedural primitive B. Primitive A is closer than primitive B, but since the non-committed set relates to the intersection with primitive A, when the intersection with primitive A is considered in the second intersection testing iteration, the tiebreaking procedure will ensure that primitive A is not found again in the second intersection testing iteration. Diagram 6 of FIG. 8b shows the distances ($T_{NCM}$, $T_{CD}$ and $T_{CM}$) in the three sets at the end of the traversal of the acceleration structure in step S206 of the second intersection testing iteration. In particular, the value of $T_{NCM}$ is not updated during this traversal of the acceleration structure so it stays equal to $T_{min}$; the value of $T_{CD}$ has been set to be at the first position at which the ray intersects the volume representing the procedural primitive B (i.e. on the front face of primitive B); and the ray has not been found to intersect with any opaque triangles so the value of $T_{CM}$ is not updated during this traversal of the acceleration structure so it stays where it was in Diagram 5. Primitive B is a procedural primitive so a traverse shader (e.g. an intersection shader if procedural primitive B is opaque, or a shader with combined functionality of an intersection shader and an any hit shader if procedural primitive B is not opaque) is executed.

In the example shown in FIG. 8b, the execution of the intersection shader in respect of the intersection of the ray with procedural primitive B commits an intersection that is at a position that is closer to the ray origin than the previously committed intersection point. It is possible that multiple intersections (or no intersections) could be committed by the intersection shader, but the last committed intersection (if any) would remain associated with the committed set at the end of the execution of the intersection shader. Diagram 7 of FIG. 8b shows the distances ($T_{NCM}$, $T_{CD}$ and $T_{CM}$) in the three sets at the end of the second intersection testing iteration, i.e. after the execution of the intersection shader in respect of primitive B. In particular, the values of $T_{NCM}$ and $T_{CD}$ are not updated by the execution of the intersection shader so they stay the same as in Diagram 6 of FIG. 8b; but the value of $T_{CM}$ is updated by the execution of the intersection shader.

In step S214 the candidate data set is copied to the non-committed data set, and the committed data set is copied to the candidate data set. Therefore, as shown in Diagram 8 of FIG. 8b, the value of $T_{NCM}$ is set to be at the front face of the primitive B, and the value of $T_{CD}$ is updated to be the same as the committed intersection distance that was found by the execution of the intersection shader in respect of primitive B. Then a third intersection testing iteration is performed (e.g. in steps S206 to S212).

In this example, the third intersection testing iteration finds (in step S206) that the nearest primitive (which has not been identified in a previous intersection testing iteration) is procedural primitive C. Primitive A is closer than primitive C but the intersection distance to primitive A is less than $T_{NCM}$ so primitive A is ignored in the traversal of the acceleration structure in the third intersection testing iteration. Primitive B is closer than primitive C but since the non-committed set relates to the intersection with primitive B, when the intersection with primitive B is considered in the third intersection testing iteration, the tiebreaking procedure will ensure that primitive B is not found again in the third intersection testing iteration. Diagram 9 of FIG. 8b shows the distances ($T_{NCM}$, $T_{CD}$ and $T_{CM}$) in the three sets at the end of the traversal of the acceleration structure in step S206 of the third intersection testing iteration. In particular, the value of $T_{NCM}$ is not updated during this traversal of the acceleration structure so it stays set to be at the front face of the primitive B; the value of $T_{CD}$ has been set to be at the first position at which the ray intersects the volume representing the procedural primitive C (i.e. on the front face of primitive C); and the ray has not been found to intersect with any opaque triangles so the value of $T_{CM}$ is not updated during this traversal of the acceleration structure so it stays where it was in Diagram 8. Primitive C is a procedural primitive so a traverse shader (e.g. an intersection shader if procedural primitive C is opaque, or a shader with combined functionality of an intersection shader and an any hit shader if procedural primitive C is not opaque) is executed.

In the example shown in FIG. 8b, the execution of the intersection shader in respect of the intersection of the ray with procedural primitive C does not commit an intersection. As such the execution of the intersection shader in respect of the intersection of the ray with procedural primitive C does not change the values of any of the distances ($T_{NCM}$, $T_{CD}$ and $T_{CM}$) from those shown in Diagram 9 of FIG. 8b.

In step S214 the candidate data set is copied to the non-committed data set, and the committed data set is copied to the candidate data set. Therefore, as shown in Diagram 10 of FIG. 8b, the value of $T_{NCM}$ is set to be at the front face of the primitive C, and the value of $T_{CD}$ is updated to be the same as the committed intersection distance $T_{CM}$ (that was found by the execution of the intersection shader in respect of primitive B).

It is still possible that another intersection occurs between $T_{NCM}$ and $T_{CM}$, so a fourth intersection testing iteration is performed (e.g. in steps S206 to S212). However, in this example, this fourth intersection testing iteration does not find any intersections between $T_{NCM}$ and $T_{CM}$. In response to determining that no intersections have been identified during the fourth iteration, the closest-hit shader is executed in respect of the latest committed intersection (on primitive B).

It can be appreciated that the examples described above allow for non-deterministic traversal of the acceleration structure, which can bring benefits, e.g. in terms of improving processing efficiency and reducing the number of times that data is fetched from memory (which can reduce the latency and power consumption of the ray tracing system). This is achieved while still ensuring that the order in which the shaders (including traverse shaders) are executed is deterministic.

Figure 9:
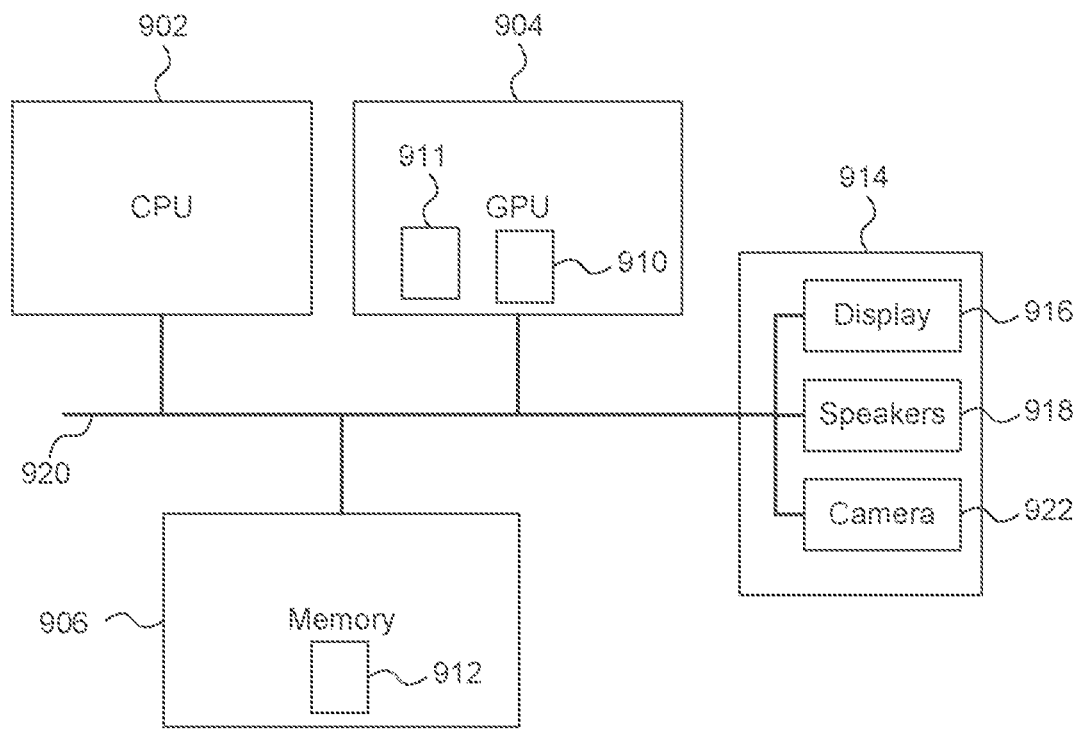
FIG. 9 shows a computer system in which a ray tracing unit is implemented.

FIG. 9 shows a computer system in which the ray tracing systems described herein may be implemented. The computer system comprises a CPU 902, a GPU 904, a memory 906 and other devices 914, such as a display 916, speakers 918 and a camera 922. A ray tracing unit 910 (corresponding to ray tracing unit 102) is implemented on the GPU 904, as well as a Neural Network Accelerator (NNA) 911. In other examples, the ray tracing unit 910 may be implemented on the CPU 902 or within the NNA 911 or as a separate processing unit in the computer system. The components of the computer system can communicate with each other via a communications bus 920. A store 912 (corresponding to memory 104) is implemented as part of the memory 906.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The ray tracing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing unit configured to perform any of the methods described herein, or to manufacture a ray tracing unit comprising any apparatus described herein. An integrated circuit definition dataset may be, for example, an integrated circuit description.

Therefore, there may be provided a method of manufacturing, at an integrated circuit manufacturing system, a ray tracing unit as described herein. Furthermore, there may be provided an integrated circuit definition dataset that, when processed in an integrated circuit manufacturing system, causes the method of manufacturing a ray tracing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing unit will now be described with respect to FIG. 10.

Figure 10:
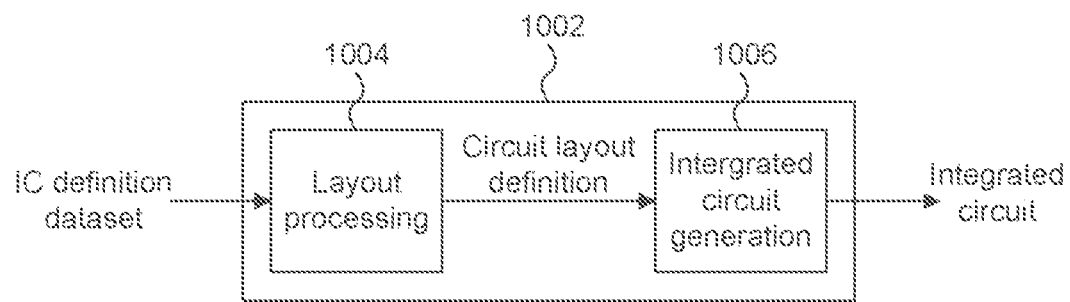
FIG. 10 shows an integrated circuit manufacturing system for generating an integrated circuit embodying a ray tracing unit.

FIG. 10 shows an example of an integrated circuit (IC) manufacturing system 1002 which is configured to manufacture a ray tracing unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a ray tracing unit as described in any of the examples herein), process the IC definition dataset, and generate an IC according to the IC definition dataset (e.g. which embodies a ray tracing unit as described in any of the examples herein). The processing of the IC definition dataset configures the IC manufacturing system 1002 to manufacture an integrated circuit embodying a ray tracing unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing a ray in a ray tracing system, comprising:
    performing intersection testing for the ray by performing one or more intersection testing iterations, wherein each intersection testing iteration comprises:
        traversing an acceleration structure to identify the nearest intersection of the ray with a primitive that has not been identified as the nearest intersection in any previous intersection testing iterations for the ray, and
        in response to determining, based on a characteristic of the primitive, that a traverse shader is to be executed in respect of the identified intersection:
            executing the traverse shader in respect of the identified intersection, and in response to the execution of the traverse shader determining that the ray does not intersect the primitive at the identified intersection, causing another intersection testing iteration to be performed; and when the intersection testing for the ray is complete, executing an output shader to process a result of the intersection testing for the ray;

wherein a traverse shader is executed in respect of an identified intersection for the ray in at least one of the one or more intersection testing iterations.

2. The method of claim 1, wherein the traverse shader is an any hit shader, and wherein the execution of the any hit shader in respect of the identified intersection determines that either:

(i) the identified intersection is accepted, such that the ray intersects the primitive at the identified intersection; or (ii) the identified intersection is discarded, such that the ray does not intersect the primitive at the identified intersection.

3. The method of claim 1, wherein the traverse shader is an any hit shader, and wherein an any hit shader is to be executed in respect of the identified intersection if the primitive is not opaque.

4. The method of claim 1, wherein the traverse shader is an intersection shader, and wherein an intersection shader is to be executed in respect of the identified intersection if the primitive is a procedural primitive which is represented as a volume for the purposes of traversing the acceleration structure.

5. The method of claim 4, wherein the volume representing the procedural primitive is an axis-aligned bounding box.

6. The method of claim 4, wherein the identified intersection of the ray with the procedural primitive is at a position which is a minimum distance along the ray at which the ray is valid and at which the ray intersects the volume representing the procedural primitive.

7. The method of claim 4, wherein the execution of the intersection shader in respect of the identified intersection determines that:

(i) the ray intersects the primitive at a further position within the volume representing the procedural primitive which is different to the position of the identified intersection, such that the ray does not intersect the primitive at the identified intersection; or (ii) the ray does not intersect the primitive within the volume of the procedural primitive, such that the ray does not intersect the primitive at the identified intersection.

8. The method of claim 1, wherein said intersection testing is performed on multiple rays, and wherein said traversing an acceleration structure comprises:

grouping rays together into a packet of rays to be tested for intersection against the same node of the acceleration structure; and processing the packet of rays to thereby test the rays of the packet for intersection against said same node of the acceleration structure.

9. The method of claim 8, wherein the acceleration structure has a hierarchical tree structure and wherein during the traversal of the acceleration structure, a ray exists in multiple branches of the hierarchical tree structure simultaneously.

10. The method of claim 1, wherein the method comprises:

in response to determining, during a current intersection testing iteration, that another intersection testing iteration is to be performed:

storing data relating to the identified intersection that was identified during the current intersection testing iteration; and using said stored data to avoid identifying the same intersection again in said another intersection testing iteration.

11. The method of claim 1, wherein three sets of data are stored for the ray during the intersection testing, the three sets of data comprising:

(i) a candidate set which keeps track of the nearest intersection that has been identified so far for the ray during the traversal of the acceleration structure in a current intersection testing iteration;

(ii) a non-committed set which indicates a minimum intersection distance at which an intersection can be accepted as an identified intersection during the traversal of the acceleration structure in the current intersection testing iteration; and (iii) a committed set which indicates a maximum intersection distance at which an intersection could be found by said intersection testing for the ray.

12. The method of claim 11, wherein at the start of an initial intersection testing iteration for the ray:

a minimum culling distance for the ray is stored in the non-committed set for the ray; and a maximum culling distance for the ray is stored in the candidate set and in the committed set for the ray.

13. The method of claim 11, wherein, in response to determining that another intersection testing iteration is to be performed after the current intersection testing iteration the method comprises, before said another intersection testing iteration is performed:

copying data from the candidate set at the end of the current intersection testing iteration into the non-committed set; and subsequently copying data from the committed set at the end of the current intersection testing iteration into the candidate set.

14. The method of claim 11, wherein each of the three sets of data comprises:

an indication of a distance along the ray; and if the set of data relates to an intersection of the ray with a particular primitive:

an indication of a type of the particular primitive;

an indication of an opacity of the particular primitive; and one or more indices associated with the particular primitive.

15. The method of claim 14, wherein the method comprises, during the traversal of the acceleration structure, in response to finding an intersection for the ray with the particular primitive at an intersection distance that is equal to an intersection distance of a previous intersection for the ray with another primitive, wherein said previous intersection is indicated by the data in one of said three sets of data:

comparing a unique primitive identifier for the particular primitive with a unique primitive identifier for said other primitive; and determining whether to treat the found intersection as nearer than the previous intersection based on the result of the comparison of the unique primitive identifiers.

16. The method of claim 15, wherein the one or more indices comprise an instance index, a geometry index and a primitive index associated with the particular primitive, the method further comprising:
  determining the unique identifier for the particular primitive using a concatenation of the instance index, the geometry index and the primitive index associated with the particular primitive; and
  determining the unique identifier for said other primitive using a concatenation of an instance index, a geometry index and a primitive index associated with said other primitive.

17. The method of claim 11, wherein, during the traversal of the acceleration structure, in response to (i) an intersection being found with a procedural primitive, and (ii) a position at said minimum intersection distance along the ray at which an intersection can be accepted as an identified intersection during the traversal of the acceleration structure in the current intersection testing iteration being within the procedural primitive:
  the found intersection is determined to be at said minimum intersection distance along the ray during the traversal of the acceleration structure.

18. The method of claim 1, wherein a result of executing the output shader is used for rendering an image of a 3D scene.

19. A ray tracing unit comprising:
  an intersection testing module; and
  processing logic;
  wherein the ray tracing unit is configured to:
    perform intersection testing for a ray by performing one or more intersection testing iterations, wherein each intersection testing iteration comprises:
      traversing an acceleration structure using the intersection testing module to identify the nearest intersection of the ray with a primitive that has not been identified as the nearest intersection in any previous intersection testing iterations for the ray, and
      in response to determining, based on a characteristic of the primitive, that a traverse shader is to be executed in respect of the identified intersection:
        executing the traverse shader on the processing logic in respect of the identified intersection, and
        in response to the execution of the traverse shader determining that the ray does not intersect the primitive at the identified intersection, causing another intersection testing iteration to be performed; and
    when the intersection testing for the ray is complete, execute an output shader on the processing logic to process a result of the intersection testing for the ray.

20. A non-transitory computer readable storage medium having stored thereon an integrated circuit definition dataset that, when processed in an integrated circuit manufacturing system, configures the integrated circuit manufacturing system to manufacture a ray tracing unit, the ray tracing unit comprising:
  an intersection testing module; and
  processing logic;
  wherein the ray tracing unit is configured to:
    perform intersection testing for a ray by performing one or more intersection testing iterations, wherein each intersection testing iteration comprises:
      traversing an acceleration structure using the intersection testing module to identify the nearest intersection of the ray with a primitive that has not been identified as the nearest intersection in any previous intersection testing iterations for the ray, and
      in response to determining, based on a characteristic of the primitive, that a traverse shader is to be executed in respect of the identified intersection:
        executing the traverse shader on the processing logic in respect of the identified intersection, and
        in response to the execution of the traverse shader determining that the ray does not intersect the primitive at the identified intersection, causing another intersection testing iteration to be performed; and
    when the intersection testing for the ray is complete, execute an output shader on the processing logic to process a result of the intersection testing for the ray.

* * * * *